United States Patent [19]

Shimada et al.

[11] Patent Number: 4,977,414
[45] Date of Patent: Dec. 11, 1990

[54] IMAGE FORMING APPARATUS

[75] Inventors: Kazuyuki Shimada, Chofu; Yoshiharu Niito, Yokohama; Yikitoshi Kiya, Kawasaki; Takahiro Yagishita, Yokohama; Masayoshi Miyamoto, Yokohama; Hideo Azumai, Yokohama; Keiichi Iwasaki, Suita, all of Japan

[73] Assignee: Ricoh Company, Ltd., Tokyo, Japan

[21] Appl. No.: 424,388

[22] Filed: Oct. 20, 1989

[30] Foreign Application Priority Data

Oct. 21, 1988 [JP] Japan .................. 63-265508

[51] Int. Cl.$^5$ ............................................. G01D 15/06
[52] U.S. Cl. ................................................ 346/154
[58] Field of Search ................ 346/160, 154; 364/519

[56] References Cited

U.S. PATENT DOCUMENTS 4,717,925 1/1988 Shibata et al. .................. 346/160 X
4,725,967 2/1988 Aiba et al. ...................... 346/160 X

FOREIGN PATENT DOCUMENTS 63-76572 6/1988 Japan .

Primary Examiner—Donald A. Griffin
Attorney, Agent, or Firm—Cooper & Dunham

[57] ABSTRACT

An image forming apparatus includes a photosensitive drum, a laser diode, and an optical scanning system provided between said laser diode and the photosensitive drum, for scanning the recording medium by deflecting the light beam emitted from the laser diode to thereby form an image on the recording medium. The optical scanning system has one of predetermined optical characteristics different from each other. The apparatus further includes a memory which stores a plurality of sets of control data provided for the predetermined optical characteristics of the optical scanning system. The control data is used for controlling the laser diode. Further, the apparatus includes a control data selecting circuit which selects one of the sets of control data which relates to the one of the predetermined optical characteristics of the optical scanning system, and a controller for controlling the laser diode on the basis of image data and the selected one of the sets of control data.

22 Claims, 16 Drawing Sheets

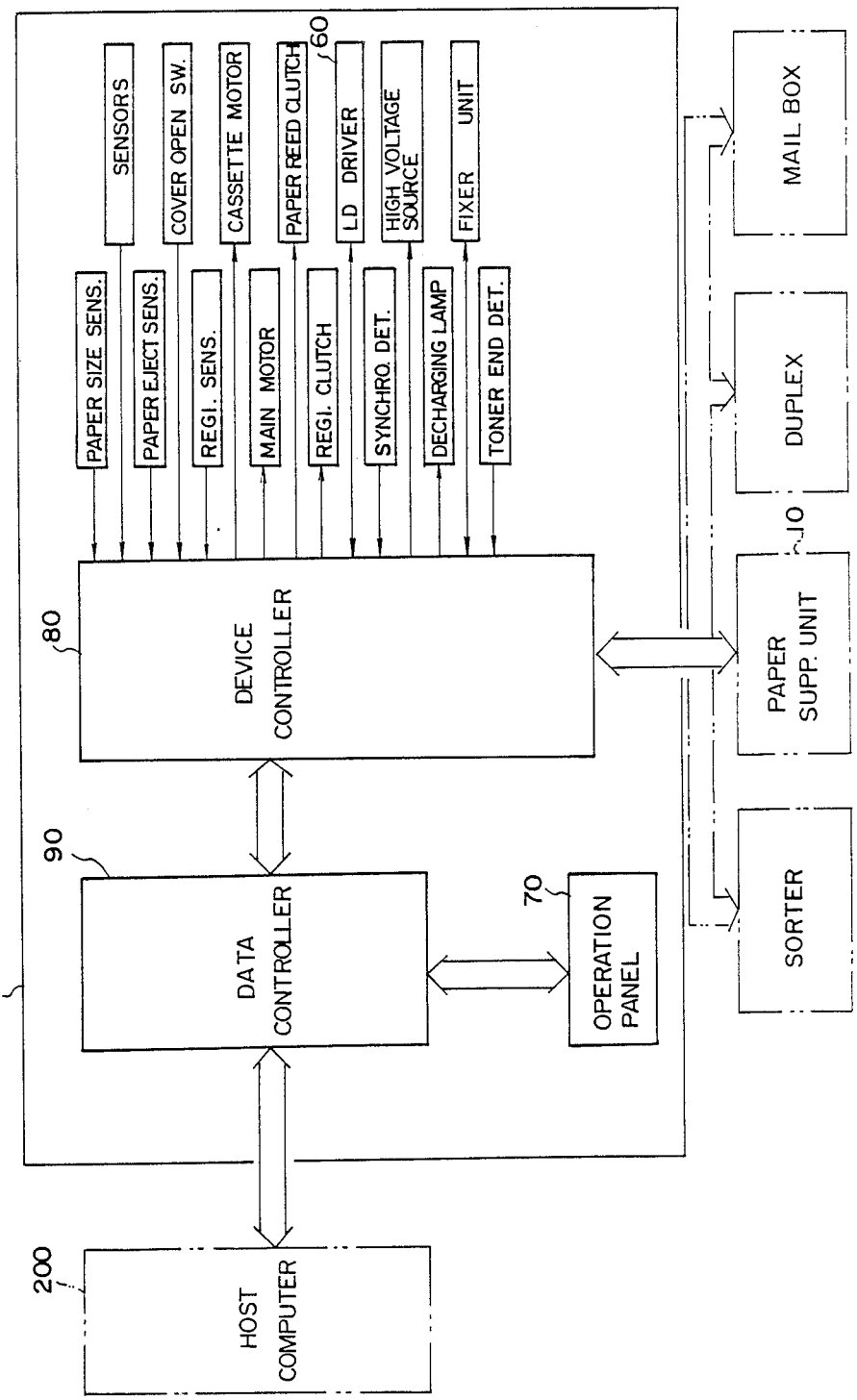

CURVED, ROTATING MIRROR

ROTATING POLARISCOPE + FLAT LENS

GALVANO MILLER

ROTATING
POLARISCOPE
+fθ LENS

IMAGE FORMING APPARATUS

BACKGROUND OF THE INVENTION

This invention relates to an image processing device having an optical scanning system, and more particularly to an image forming device provided with an optical scanning system which deflects a laser beam in a constant main direction on a recording medium such as a photosensitive drum.

A laser beam printer is representative of image forming devices of this type. A laser beam printer has a laser diode and a rotating polygonal mirror. A laser beam emitted from a laser diode is deflected by the polygon mirror so as to scan a circumferential surface of a photosensitive medium in a drum shape in a main scanning direction. In other words, the laser beam from the polygon mirror is continuously irradiated on the surface of the photosensitive drum in a direction parallel to the drum axis. The above-mentioned scan is repeatedly carried out. (This process is called line scanning). During each of these line scans, the laser beam is turned ON or OFF for every one dot. Generally, the laser beam is turned ON when one dot is to be recorded On the other hand, the laser beam is turned OFF when no recording is indicated. The surface of the photosensitive drum is uniformly charged prior to being exposed by the laser light beam and the charge is removed from the exposed parts so that an electrostatic latent image is formed thereon. Toner is then applied to this electrostatic latent image and developing is performed so that a toner image is produced. Thereafter, the toner image is transferred to transfer paper.

Various types of laser scanning means for performing the main scanning of the photosensitive drum have been proposed. For example, there are those that use a Galvano mirror, those that use a curved polygonal mirror, those that use a rotating polygonal mirror (which is a combination of a rotating polygonal mirror and a deflector), each in combination with a flat lens, or a rotating deflector and an Fθ lens, and the like.

In all cases, the beam of the laser diode moves back and forth at an equivalent angular velocity, in the main scanning direction. However, the photosensitive drum that receives this light at the center of its motion, has a linear shape and so the line scanning speed on the photosensitive drum becomes unequal for within the same line. For this reason, the exposure time (scanning time) for an area of one dot on any one line is long for the points close to the midpoint, and shorter for the further a point is distant from the midpoint. Because of this, many equal line scanning speed means have been proposed, amongst them being the use of polygonal mirrors with curved surfaces, and the use of Fθ lenses.

However, these mechanical and optical means for achieving an equal scanning speed must be precise and their manufacture and processing is not simple. The reason for this is that a rational means must be found to produce equal speed compensation for across an entire scanning line which is relatively long when compared to the series of extremely small virtual dots that include it.

Therefore, it is desirable that these equal speed means be either eliminated altogether or be substituted by some means by which a relatively rough level of compensation can be performed. In order to do this, for example, it is possible in the image write processing circuit that forms the image in dot units, to give a main scanning synchronization signal that renews the image signal in dot units for the middle portion of the scan line, and to make the cycle shorter for the further a point is away from the middle portion. (This is known as frequency modulation.) Moreover, it is also possible to reduce the power to the laser diode for dots in the middle portion and to make the cycle longer for the further a point is away from the middle portion. (This is known as power modulation.) Japanese Patent Laid Open Application No. 76572/1988 is one such image forming device that has been proposed.

With such devices, then the above-mentioned frequency modulation and power modulation make the amount of light received for each dot in the said exposure line effectively the same even if the scanning of the exposure line on the photosensitive drum is performed at an unequal angular speed because of the beam moving back and forth at a constant angular speed. Moreover, the scanning of each dot and the image signals allocated to that dot can be synchronized so that there is no effective change in either the shape or the recording density of the image. Accordingly, mechanical and optical equal speed means can be eliminated and a relatively rough level of compensation can be performed for the equal speed means.

In laser printers of this type, the main unit of the laser beam printer is generally common and the previously described scanning means are made as units. It is desirable that only these scanning means can be capable of being incorporated into a laser beam printer main unit in accordance with the type of machine required as this would facilitate parts management, assembly management, product adjustment, quality control, product management and other work.

However, as has been described above, there are various types of optical scanning means available and even those that use the same method have large differences in the manufacture and the production because of the differences in the elements configuring them.

Because of this, the main scanning characteristics of scanning means differ according to the optical scanning method used. Therefore, when an optical scanning unit is to be selectively incorporated into a laser beam printer main unit, and when a unit is to be exchanged for a new unit, it is necessary to have selective incorporation, renewal or replacement along with the electrical circuit elements that perform the frequency modulation and power modulation.

Therefore, the selective incorporation, renewal or replacement of the aforementioned electrical circuit elements accompanying the selective incorporation, renewal or replacement of the optical scanning unit has not been easy.

SUMMARY OF THE INVENTION

Accordingly, it is a general object of the present invention to provide a novel and useful image forming device having an optical scanning system, in which the problems described heretofore are eliminated.

A more specific object of the present invention is to provide an image forming system for which the selective incorporation, renewal or replacement of the optical scanning unit is facilitated.

The above objects of the present invention can be achieved by an image forming apparatus comprising a recording medium, light source means for emitting a light beam, optical scanning means, provided between the light source means and the recording means, for scanning the recording medium by deflecting the light beam emitted from the light source means to thereby form an image on the recording medium, the optical scanning means having one of predetermined optical characteristics different from each other, memory means for storing a plurality of sets of control data provided for the predetermined optical characteristics of the optical scanning means, the control data being used for controlling the light source means, control data selecting means for selecting one of the sets of control data which relates to the one of the predetermined optical characteristics of the optical scanning means, and control means for controlling the light source means on the basis of image data and the selected one of sets of control data.

The above-mentioned objects of the present invention can also be achieved by an image forming apparatus comprising a recording medium, light source means for emitting a light beam, optical scanning means, provided between the light source means and the recording means, for scanning the recording medium by deflecting the light beam emitted from the light source means to thereby form an image on the recording medium, the optical scanning means having one of predetermined optical characteristics different from each other, memory means for storing a plurality of sets of control data provided for the predetermined optical characteristics of the optical scanning means, the control data being used for controlling the light source means, control data selecting means for selecting one of the sets of control data which relates to the one of the predetermined optical characteristics of the optical scanning means, and control means for controlling the light source means on the basis of image data and the selected one of sets of control data. Each of the sets of the control data includes first characteristic data relating to a corresponding dot area scanning time during which the light source means continuously emits the light beam to form one dot area, and second characteristic data relating to a corresponding strength of the light beam emitted from the light source means. The control means includes first means for turning ON/OFF the light source means for every dot in accordance with the image data, second means for setting a real scanning time during which the light source means continuously emits the light beam to form one dot area on the basis of the first characteristic data relating to the corresponding dot area scanning time included in the selected one of the sets of control data, and third means for adjusting the strength of the light beam to be emitted from the light source means on the basis of the second characteristic data relating to the corresponding strength of the light beam included in the selected one of the sets of control data. Thereby, the recording medium can be scanned by the light beam adjusted so as to conform to the optical characteristic of the optical scanning means.

The aforementioned objects of the present invention can also be achieved by an image forming apparatus comprising a recording medium, light source means for emitting a light beam, optical scanning means, provided between the light source means and the recording means, for scanning the recording medium by deflecting the light beam emitted from the light source means to thereby form an image on the recording medium, the optical scanning means having one of predetermined optical characteristics different from each other, memory means for storing a plurality of sets of control data provided for the predetermined optical characteristics of the optical scanning means, the control data being used for controlling the light source means, control data selecting means for selecting one of the sets of control data which relates to the one of the predetermined optical characteristics of the optical scanning means, and control means for controlling the light source means on the basis of image data and the selected one of sets of control data. Each of the sets of the control data includes first characteristic data relating to a corresponding dot area scanning time during which the light source means continuously emits the light beam to form one dot area, second characteristic data relating to a corresponding strength of the light beam emitted from the light source means, and third characteristic data relating to a corresponding scan starting position on the recording medium. The control means includes first means for turning ON/OFF the light source means for every dot in accordance with the image data, second means for setting a real scanning time during which the light source means continuously emits the light beam to form one dot area on the basis of the first characteristic data relating to the corresponding dot area scanning time included in the selected one of the sets of control data, third means for adjusting the strength of the light beam to be emitted from the light source means on the basis of the second characteristic data relating to the corresponding strength of the light beam included in the selected one of the sets of control data, and fourth means for adjusting the scan start position on the basis of the characteristic data relating to the corresponding scan starting position included in the selected one of the sets of control data. Thereby, the recording medium can be scanned by the light beam adjusted so as to conform to the optical characteristic of the optical scanning means Other objects and further features of the present invention will be apparent from the following detailed description when read in conjunction with the accompanying drawings.

BRIEF DESCRIPTION OF THE DRAWINGS

FIG. 3A is a block diagram indicating the outline configuration of an electrical system incorporated into the embodiment of the present invention in FIG. 1;

DESCRIPTION OF THE PREFERRED EMBODIMENTS

Figure 1:
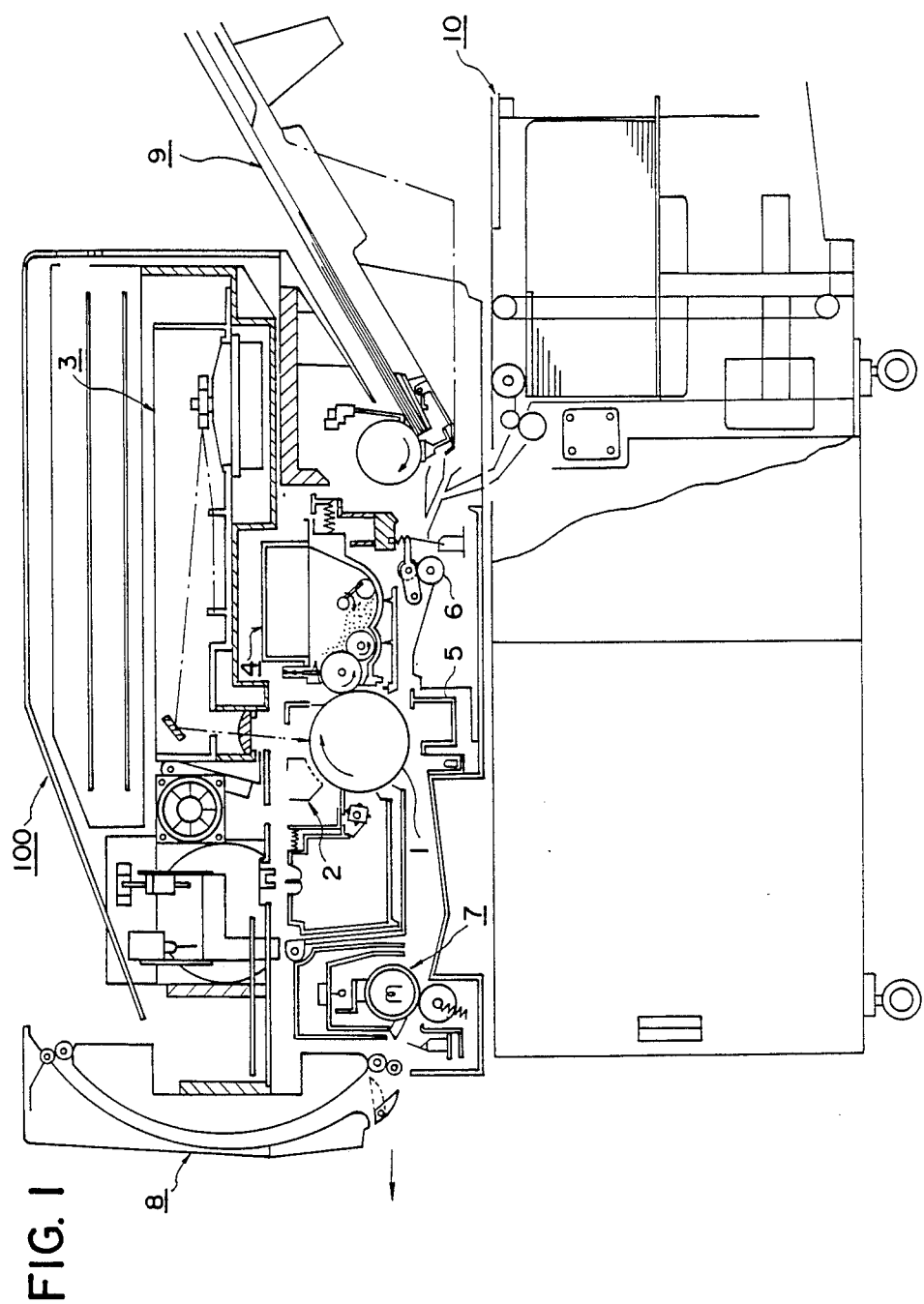
FIG. 1 is an elevational view of mainly the machine configuration of one embodiment according to the present invention.

FIG. 1 indicates a configuration of an embodiment according to the present invention. This embodiment is a laser bean printer that records the images corresponding to image signals onto transfer paper (recording paper). The surface of a photosensitive drum 1 is uniformly and negatively charged by a main charger 2. A laser scanning unit 3 performs an exposure corresponding to the image signals, with respect to the charged surface, and this forms an electrostatic latent image on the surface of the photosensitive drum 1. A developer unit 4 applies toner to the areas of the electrostatic latent image. The exposure to the electrostatic latent image has caused the negative charge to either disappear or weaken. Doing this forms a toner image corresponding to the electrostatic latent image. This toner image is transferred to transfer paper that is sent by registration rollers 6 in a transfer/discharger unit 5. The transfer paper to which the toner image has been transferred, is then sent to a fixer 7. The transfer paper is then subjected to heat and pressure and sent to an eject unit 8, and is then ejected from the eject unit 8 to outside of the printer.

Transfer paper is repeatedly taken from a paper supply tray 9 or from a large-capacity paper supply cassette 10 (which is an option), and is sent to the transfer/discharger unit 5.

Figure 2A:
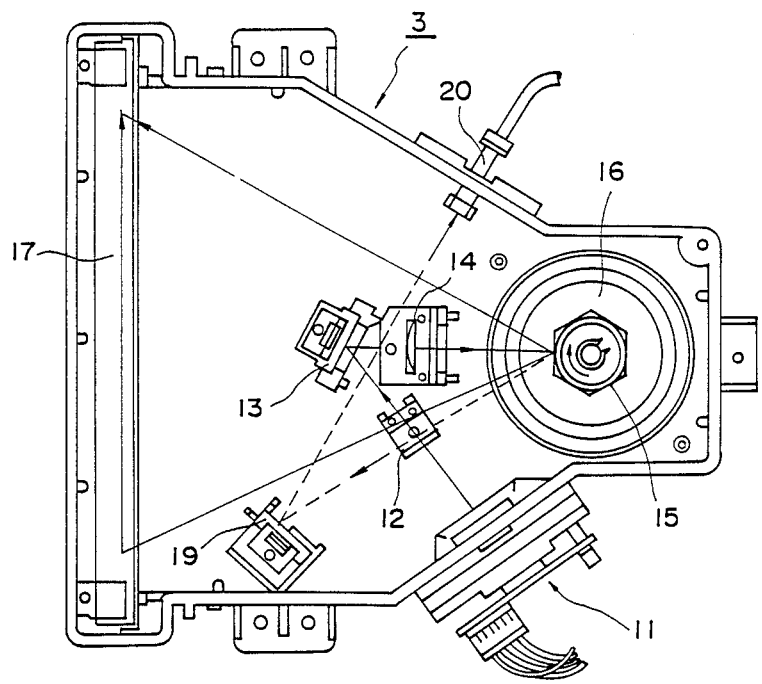
FIG. 2A is an enlarged planar view of the laser scanning unit 3 in FIG. 1.
Figure 2B:
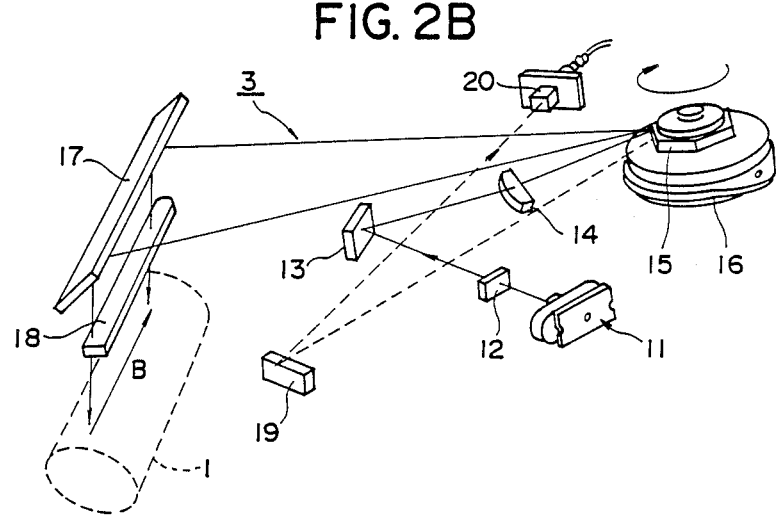
FIG. 2B is a perspective view of the main elements of the laser scanning unit 3.

FIG. 2A is an enlarged plan view of the laser scanning unit 3 in FIG. 1. FIG. 2B is an outline diagram indicating the layout relationship between the elements configuring the laser scanning unit 3. In this laser scanning unit 3, a light beam emitted by a light source 11 that incorporates a laser diode, passes through a first cylindrical prism 12 and is then reflected by a first mirror 13. This reflected light beam then passes through a spherical lens 14 and is irradiated onto a rotating polygonal mirror 15. The rotating polygonal mirror 15 is driven at a constant speed by a motor 16 and reflects the irradiated beam. The rotation of the rotating polygonal mirror 15 gradually increases the angle of the mirror surface reflecting the irradiated light beam with respect to the irradiated beam. In the example shown in the FIGS. 2A, 2B a new mirror surface is irradiated by the light beam for every 360°/6 and the light beam reflected from the rotating polygonal mirror 15 repeatedly moves from side to side (main scanning B) as shown in FIG. 2B.

The light beam reflected from the rotating polygonal mirror 15 is reflected by a second mirror 17 and passes through a second cylindrical lens 18 to be irradiated onto the photosensitive drum 1. This irradiated beam performs line scanning of the surface of the photosensitive drum 1 (as shown by B in FIG. 2B). During this line scanning, the laser diode (LD in FIG. 3E) of the light source 11 is turned ON (current applied) and OFF (current not applied) in correspondence with image signals (indicating whether or not each dot in a line is to be recorded). This performs selective discharging in dot units, of the surface of the negatively charged photosensitive drum 1, and forms an electrostatic latent image on the surface of the photosensitive drum 1.

Outside of the zone for line scanning the photosensitive drum 1 is disposed a mirror 19. The light beam reflected from this mirror 19 is irradiated onto a photosensor 20. The photosensor 20 responds to the irradiated light beam and outputs a detect signal which is a line synchronization signal. This line synchronization signal represents the line scanning (B in FIG. 2B) divisions (the line changes when the reflective surface of the mirror changes).

Such a laser beam printer is further disclosed in U.S. patent application Ser. No. 244,910 (now U.S. Pat. No. 4,899,182), the disclosure of which is hereby incorporated by reference.

FIG. 3A indicates an outline configuration of an electrical system for the laser beam printer indicated in FIG. 1. The printer controller comprises a data controller 90 and a device controller 80. The data controller 90 is connected to an operation panel 70 and to a host computer (or scanner) 200, which supplies the image data. The data controller 90 performs reading of the instruction input from the operation panel 70, and instruction control of the operation panel 70. On the basis of instruction input from the host computer (or scanner) 200, the data controller 90 also performs setting of the print mode, receiving of the image data from the host computer (or scanner) 200, and transfer of the image data to the device controller 80.

The device controller 80 is connected to a signal processing circuit connected to various types of sensors (paper size sensor, paper eject sensor, registration sensor, synchronization detector, toner end detector, cover-open switch) for detecting the status, and also various types of drivers that electrically urge each various types of apparatus (main motor, registration clutch, decharging lamp, cassette motor, paper feed clutch, high-voltage power source, fixer unit and LD driver 60) for printing processing. In addition, device controller 80 is connected to optional apparatus such as large-capacity paper supply unit 10. Moreover, the optional functions that can be connected to device controller 80 also include a sorter, a dual-sided (duplex) unit and a mailbox. In order to execute a print cycle specified by the data controller 90, the device controller 80 performs sequence control of each of the apparatus while referring to the detected signals from each of the sensors.

Figure 3B:
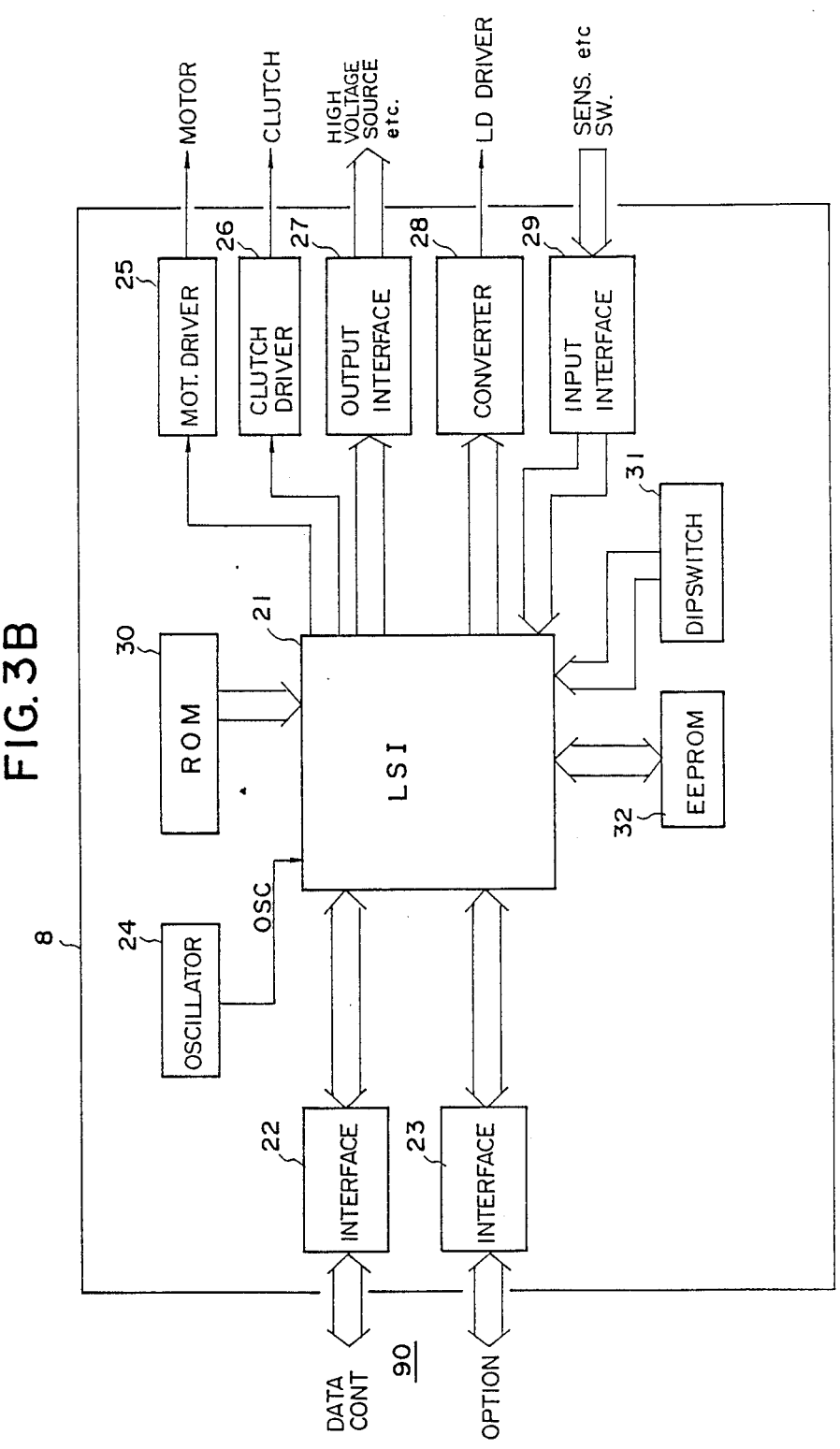
FIG. 3B is a block diagram indicating the outline configuration of a device controller 80 indicated in FIG. 3A.

FIG. 3B indicates the configuration of a device controller 80. The main unit of the device controller 80 includes an LSI 21. This LSI 21 is designed to execute a print cycle and this print cycle is what urges or does not urge the print mechanism elements of the laser beam printer at a predetermined timing and for the image of a predetermined density and size to be recorded to the transfer paper. The LSI 21 is connected to interfaces 22, 23 for connecting the data controller 90 and the optional devices, an oscillator 24 mainly including a crystal oscillator, various types of drivers 25, 26, an output interface 27, an input interface 29 and a converter 28, and the like.

The LSI 21 is also connected to a ROM 30 in which data for optical scanning characteristics compensation and other data is stored, dipswitches 31 for specifying data for optical scanning characteristics compensation and other data in accordance with the laser scanning unit mounted, and an EEPROM 32 for storing print conditions data such as the number of sheets for printing and the like, and which has been sent specified by the data controller 90. The ROM 30, dipswitches 31 and EEPROM 32 are provided so that the laser beam printer of this embodiment can make use of the laser scanning unit 3 having the configuration as described above, or a laser scanning unit having some other configuration.

Figure 3C:
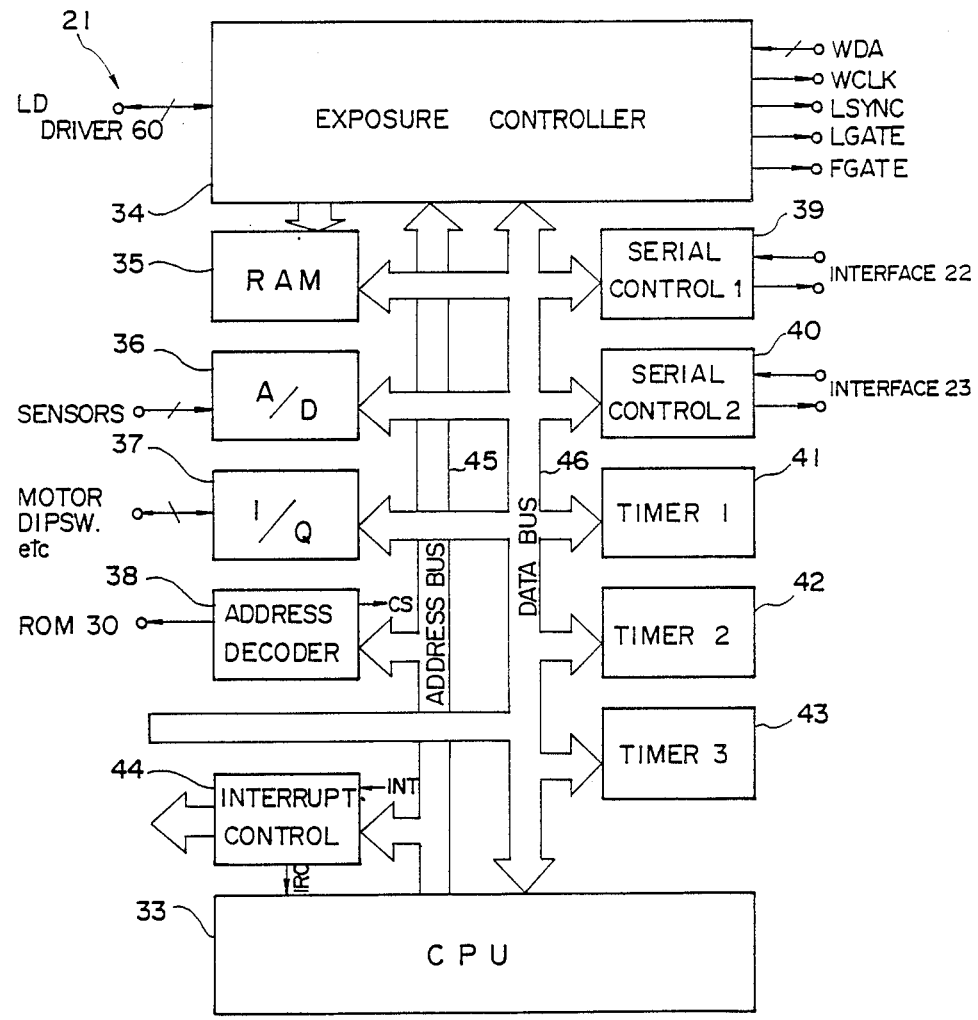
FIG. 3C is a block diagram indicating the internal configuration of the LSI 21 indicated in FIG. 3B.
Figure 3D:
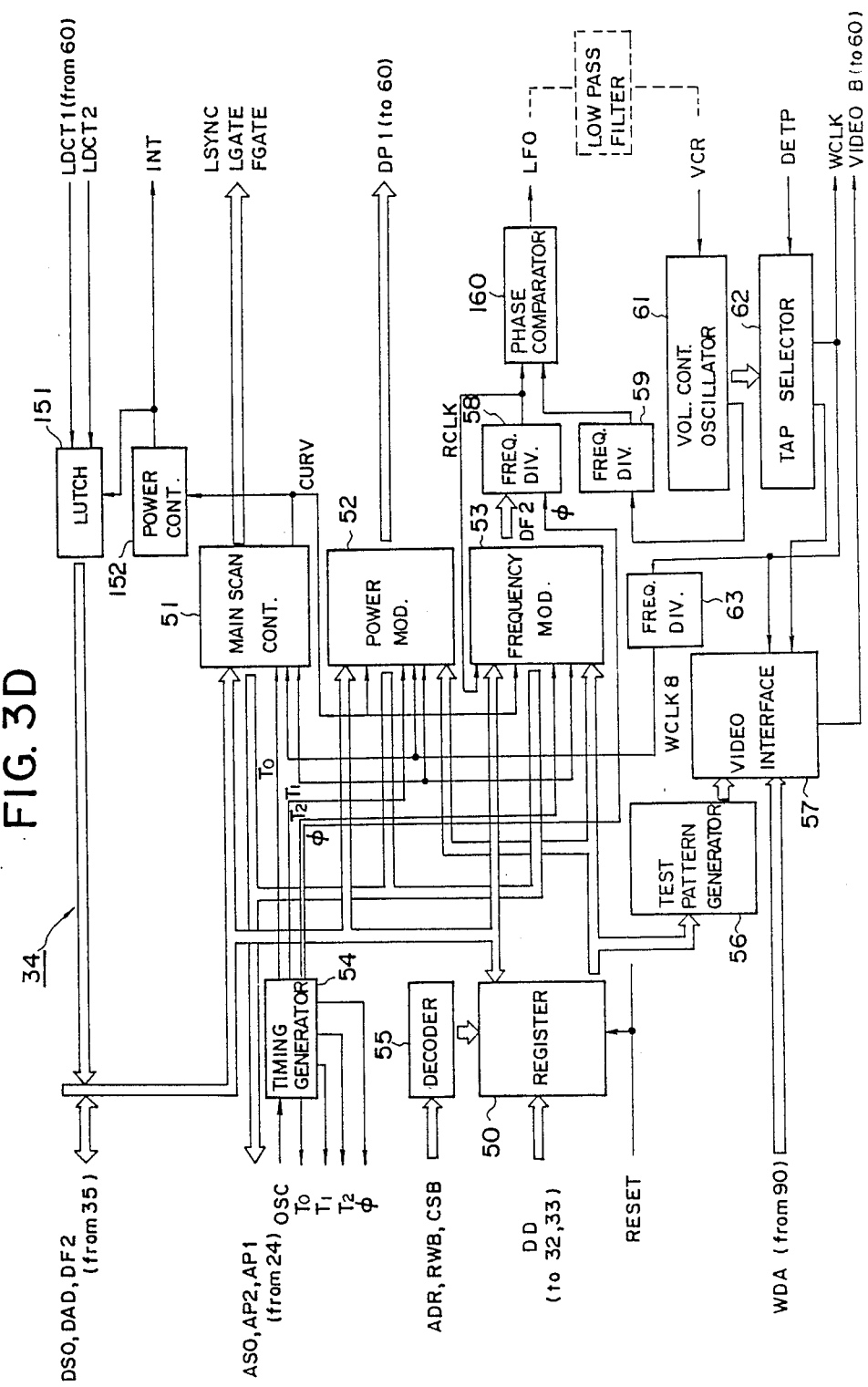
FIG. 3D is a block diagram indicating an outline of the internal configuration of the exposure controller 34.

FIG. 3C indicates a configuration of the LSI 21 that mainly comprises the device controller 80, and FIG. 3D indicates a configuration of an exposure controller 34. Referring to FIGS. 3C and 3D, the LSI 21 is a single-unit LSI and is connected via an address bus 45 and a data bus 46, to a central processing unit (hereinafter referred to as a CPU) 33, an exposure controller 34, a RAM 35, an A/D converter 36, an input/output port 37, an address decoder 38, serial controllers 39, 40, timers 41 through 43, and interrupt controller 44.

Immediately after the power has been applied, the data specified by the dipswitches 31 is read from the ROM 30 and is written to a RAM 35. The data that is read from the ROM 30 (the data that is written to RAM 35) is an 8-bit (D1 through D8) code DD expressed by the open/closed (0/1) status of each of the eight dipswitches (such that the recording dot density specification has the two bits D1 and D2, the model specification of the laster scanning unit 3 has the two bits D3 and D4, and the recording position adjustment specification for the main scanning direction B has the four bits D4 through D8). Of these code DD, the main scanning count data DSO are specified by D1 through D4, the power modulation data DAD and the frequency modulation data DF2 specified by data D3 and D4 of the appropriate 8-bit DD, and the recording position adjustment data specified by data D5 through D8 of the appropriate 8-bit code DD. When the CPU 33 instructs the data controller 90 to specify recording start, the reading of the sensor signals and the urging or nonurging (recording process sequence control) of the electrical device elements is performed in a predetermined sequence.

The exposure controller 34 generates a main scanning synchronization signal WCLK (output to the data controller 90) in accordance with the output frequency modulation data DF2 read from RAM 35. In addition, the exposure controller 34 generates a recording start signal and the like for the main scanning direction and on the basis of the main scanning direction data DSO supplied from the RAM 35 through the data bus 46, adjusts the timing of the recording start signal on the basis of the recording position adjustment data read from the RAM 35, and generates LSYNC, LGATE signals specifying the recording area of the main scanning direction B. Furthermore, the exposure controller 34 controls the power specification data DP1 on the basis of the power modulation data DAD read from the RAM 35, and the VIDEO B image signals from the host computer (or scanner) 200 via the data controller 90, and supplies them to the LD driver 60. The LD driver 60 controls the light emitting power on the basis of the supplied power specification data DP1 and the VIDEO B image signals.

To explain in more detail, when the exposure controller 34 receives an exposure specification from the CPU 33, it divides a clock pulse generated by the oscillator 24 (FIG. 3B), so as to generate a clock $\phi$ which it then counts, and generates a main scanning synchronization signal WCLK with a frequency in accordance with the output frequency modulation data DF2. The exposure controller 34 divides the main scanning synchronization signal WCLK and generates a main scanning clock WCLK8. Then, on the basis of the main scanning clock WCLK8 and using as a reference point the laser line scanning synchronization signal DETP generated by the photosensor 20 of the laser scanning unit 3, the exposure controller 34 generates the LSYNC signal that determines the start of recording on the line, and the LGATE signal that determines the recording width on the line. Moreover, on the basis of the laser line scanning synchronization signal DETP, the exposure controller 34 generates the FGATE signal that determines the recording width in the sub-scanning direction (the direction perpendicular to the main scanning direction B indicated in FIG. 2B).

In synchronization with the main scanning synchronization signal WCLK, the exposure controller 34 also generates a timing signal CLK2 to renew the power specification data DP1 for the laser diode, and which therefore determines the amount of exposure light at each of the dot positions on the line. In synchronization with these timing signals CLK2, the exposure controller 34 continues to renew and read the power modulation data DAD from the RAM 35 and to generate power specification data DP1. The exposure controller 34 sends the power specification data DP1 to the LD driver 60 and also sends to the LD driver 60 the VIDEO B image signals that are sent from the data controller 90. On the basis of the frequency modulation reference signal RCLK, the exposure controller 34 also generates a timing signal CLK3 that renews and reads the frequency modulation data DF2. The exposure controller 34 then renews and reads the frequency modulation data DF2 from the RAM 35, and in synchronization with these timing signals CLK3.

A further description is given of the configuration of the exposure controller 34 with reference to FIG. 3D. Initial frequency data FINT and initial power data PINT read from the ROM 30 by the CPU 33 using the data DD (D1 through D8) from the dipswitches 31, are written to the internal register 50, and applied to a power modulator (power modulation controller) 52 and a frequency modulator (frequency modulation controller) 53. The address specifying the address and the data destination for write to the internal register 50 are applied to a decoder 55. A clock OSC derived from the oscillator 24 is applied to a timing generator 54, which generates timing signals $\phi$, $T_0$, $T_1$ and $T_2$ on the basis of the clock OSC. The signal $\phi$ is a count pulse for the purpose of generating a frequency modulation reference signal RCLK. $T_0$, $T_1$ and $T_2$ determine the timing for reading the data DSO, DAD and DF2 from the RAM 35.

Figure 6A:
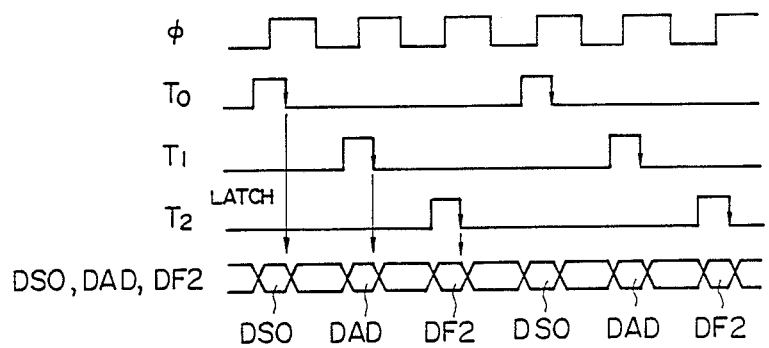
FIG. 6A is a time chart indicating the read timing for the main scanning counter data DSO, the power modulation data DAD and the output frequency modulation data DF2 from the RAM 35 indicated in FIG. 3C.

FIG. 6A indicates the relationship between the timing pulses $T_0$, $T_1$ and $T_2$, and the DSO, DAD and DF2 data read from the RAM 35. Moreover, $T_0$, $T_1$ and $T_2$ are clock pulses that divide $\phi$ into three and are each have a phase difference of one $\phi$ pulse.

Turning to FIG. 3D, a test pattern generator 56 is a memory which stores image data expressing a standard image for the test operation of the laser beam printer. When image data output in the test mode has been specified, the test pattern generator 56 outputs image data consisting of 8 bits at a time to a video interface 57. The video interface 57 includes two pairs of image buffer memories, each of which stores one line of image signals for the main scanning direction B. In an actual print mode, the video interface 57 receives one line at a time of image data in 8-bit units from the data controller 90, and the received image data is written to the pair of buffer memories while the image data (image signal) VIDEO B is serially read from the other pair of buffer memories and in synchronization with the main scanning synchronization signal WCLK. The image data write and read operations are performed alternately for the two pairs of buffer memories. Frequency dividers 58, 59, phase comparator 160, voltage control oscillator 61 and the tap selector 62 configure a PLL oscillator, which generates the main scanning synchronization signals WCLK with the frequency specified by frequency modulator 53. The PLL oscillator is reset by a laser line scanning synchronization signal DETP and generates the main scanning synchronization signal WCLK of a frequency corresponding to the frequency modulation data from the frequency modulator 53. The main scanning synchronization signals WCLK is divided by a frequency divider 63 to form the main scanning clock WCLK8.

The following explanation will refer to FIG. 4 and FIG. 5A through FIG. 5D and will describe that the data is stored beforehand in the ROM 30 and is written to the RAM 35 by the CPU 33. First, the dipswitches 31 are made up of eight switches. The opening/closing (0/1) of these switches creates the 8-bit data DD (D1 through D8) shown in FIG. 4 and this data DD specifies the items indicated in the following table. This is to say that D1 and D2 of the data DD specify the recording dot density, D3 and D4 specify the identification code or the format of the laster scanning unit (the laser scanning unit 3 mounted), and D5 through D8 specify the recording position of the main scanning direction B (of FIG. 2B) with respect to the paper supplied from the large-capacity paper supply cassette 10 which is an option (so that there is adjustment of the paper supply position shift in the main scanning direction B for when there is paper supply from the paper supply tray 9 of the main unit, and when there is paper supply from the large-capacity paper supply cassette 10).

TABLE

| D1, | D2: | Dot density selector switch | |
|---|---|---|---|
| 0, | 0 | 240 D P I | |
| 0, | 1 | 300 D P I | |
| 1, | 0 | 400 D P I | 0: OFF |
| 1, | 1 | 480 D P I | 1: ON |
| D3, | D4: | Optical system selector switch | |
| 0, | 0 | Curved, rotating polygonal mirror | |
| 0, | 1 | Rotating deflector + flat lens | |
| 1, | 0 | Galvano mirror | |
| 1, | 1 | Rotating deflector + f$\theta$ lens | |
| D5, | D6, D7, D8: | Side registration adjustment switch | |

TABLE-continued

| 0, | 0, | 0, | 0 | −64 | d o t |
|---|---|---|---|---|---|
| 0, | 0, | 0, | 1 | −56 | d o t |
| 0, | 0, | 1, | 0 | −48 | d o t |
| 0, | 0, | 1, | 1 | −40 | d o t |
| 0, | 1, | 0, | 0 | −32 | d o t |
| 0, | 1, | 0, | 1 | −24 | d o t |
| 0, | 1, | 1, | 0 | −16 | d o t |
| 0, | 1, | 1, | 1 | −8 | d o t |
| 1, | 0, | 0, | 0 | +/−0 | d o t (middle value) |
| 1, | 0, | 0, | 1 | +8 | d o t |
| 1, | 0, | 1, | 0 | +16 | d o t |
| 1, | 0, | 1, | 1 | +24 | d o t |
| 1, | 1, | 0, | 0 | +32 | d o t |
| 1, | 1, | 0, | 1 | +40 | d o t |
| 1, | 1, | 1, | 0 | +48 | d o t |
| 1, | 1, | 1, | 1 | +56 | d o t |

Note: Rotating deflector: rotating polygonal mirror, hologram scanner
Note: For negative values, image printing is started from a position deviating from the middle value by a certian number of dots on the left side with respect to the direction of paper passage.
For positive values, image printing is started from a position deviating from the middle value by a certain number of dots on the right side with respect to the direction of paper passage.

In this embodiment, D3 and D4 of the data DD (i.e. the format or type of the laser scanning unit) input by the dipswitches 31 is assumed to be one of the four types shown in the table on the previous page. The ROM 30 stores main scanning counter data DSO, power modulation data DAD, PINT, output frequency modulation data DF2 and FINT into four groups corresponding to the type of laser scanning unit 3 (as expressed by D3 and D4 of the data DD). Each one of these four groups of data has four pairs of data. These are assumed to be four types of recording dot densities (of 240DPI, 300DPI, 400DPI and 480DPI) for each type of laser scanning unit. As indicated in FIG. 5A through FIG. 5D, the main scanning counter data DSO, power modulation data DAD, PINT, output frequency modulation data DF2, and FINT allocated for each type of laser scanning unit are stored in regions in the ROM 30 for each group. Moreover, in the ROM 30, the group corresponding to the laser scanning unit is specified by D3 and D4 of the data DD set by the dipswitches 31, and each of the pairs in the group is specified by D1 and D2 of the data DD.

Figure 6B:
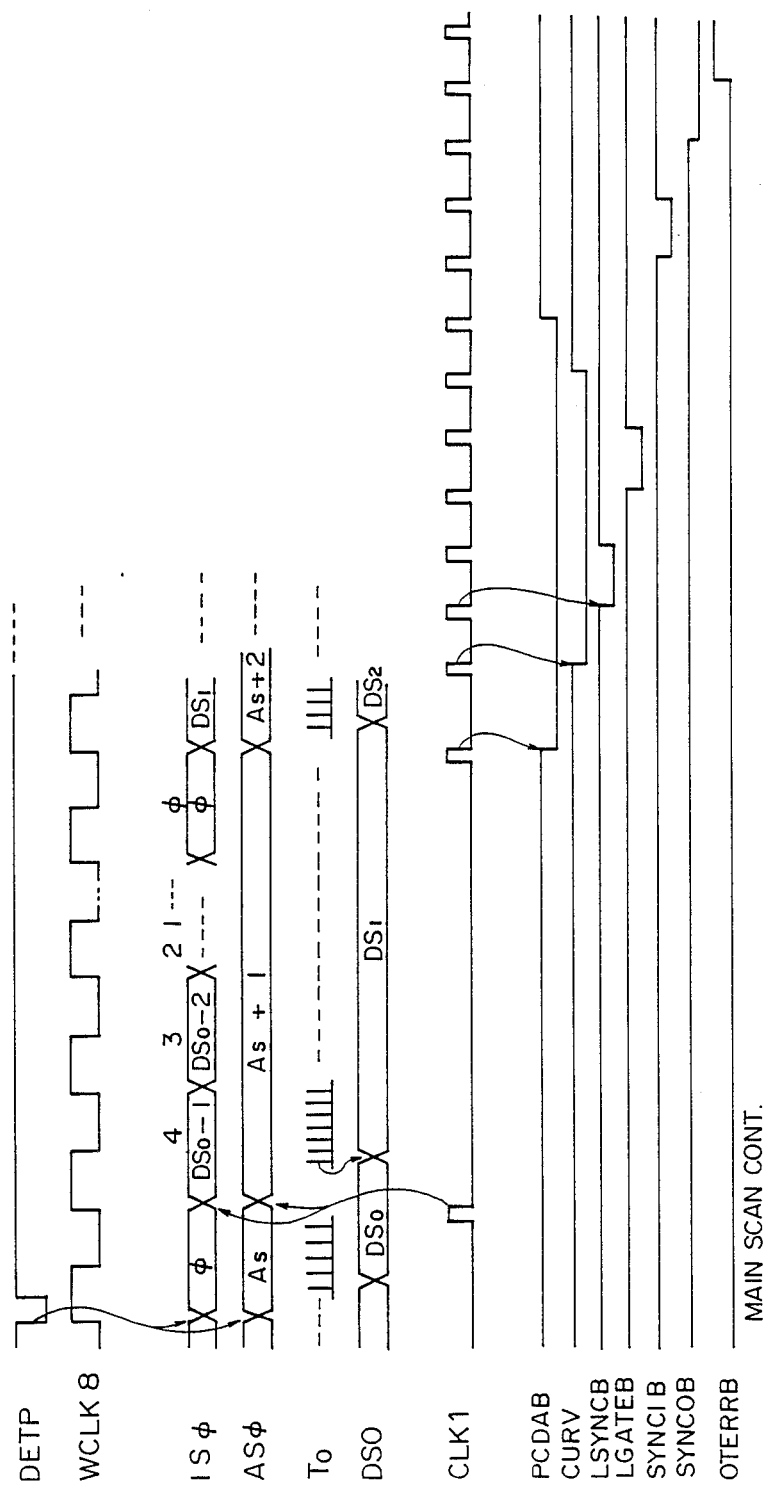
FIG. 6B is a time chart indicating the input signals and the input data, and output signals of the main scanning controller 51 indicated in FIG. 3D.
Figure 6C:
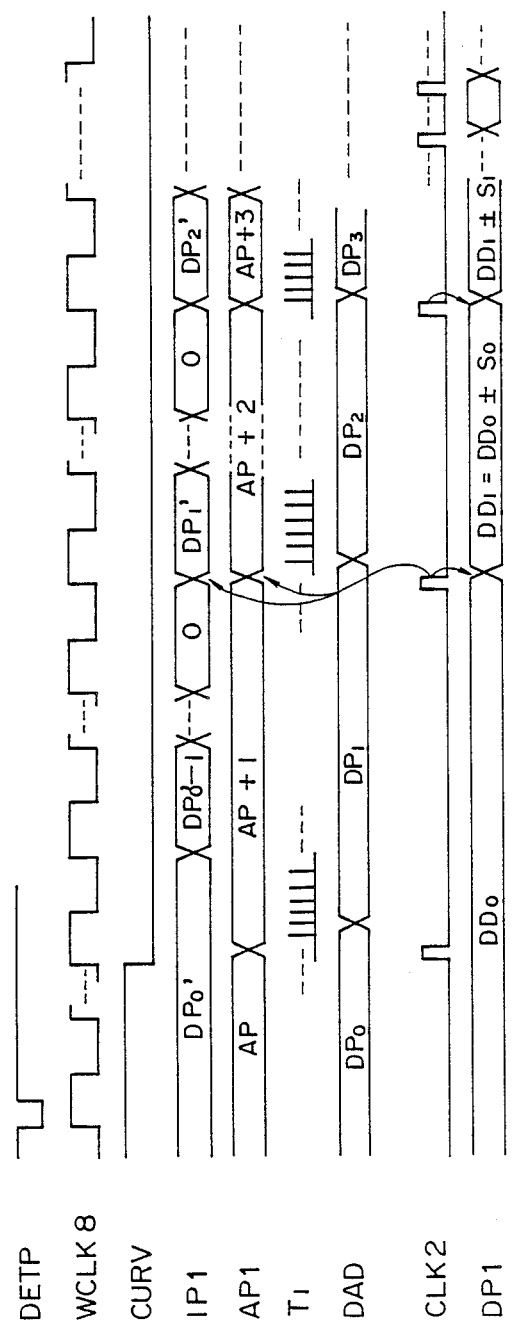
FIG. 6C is a time chart indicating the input signals and the input data, and output signals of the power modulator 52 indicated in FIG. 3D.
Figure 6D:
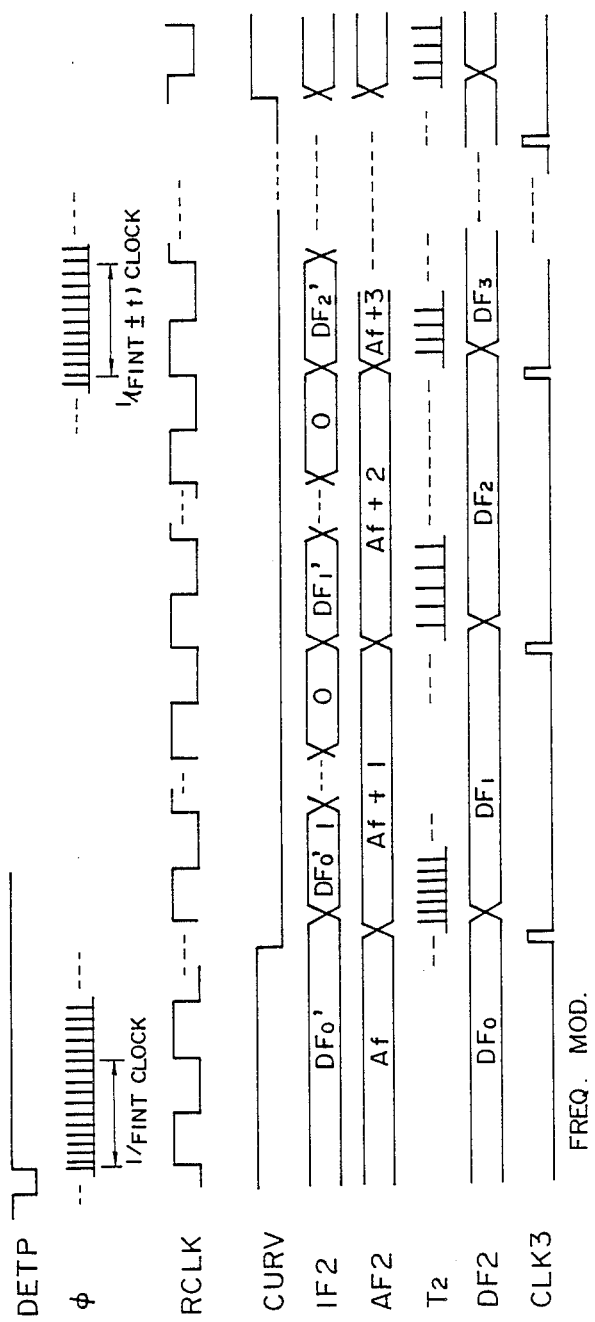
FIG. 6D is a time chart indicating the input signals and the input data, and the output signals of the frequency modulator 53 and the frequency divider 58 indicated in FIG. 3D.

The following is a description of the main scanning counter data DSO and the laser line scanning synchronization signal DETP, with reference to FIG. 6D. The main scanning counter data DSO is the basic data for the generation of the recording main scanning synchronization signal LSYNC for the main scanning direction B having the laser line scanning synchronization signal DETP as the start point, the recording area specification signal LGATE and other timing signals for recording processing. The main scanning counter data DSO is a time series where the switching interval (rising/falling) between adjacent timing signals is expressed by the count value ($DS_0$, $DS_1$, $DS_2$, ...) of the main scanning clock WCLK8.

The main scanning controller 51 (FIG. 3D) comprises an address counter, a down counter and a data register (not indicated in the diagrams). The data read from the RAM 35 with the fall of the timing signal $T_0$ immediately after the laser line scanning synchronization signal DETP has fallen, is written to the data register of the main scanning controller 51 and then loaded to the down counter. The down counter then down counts the main scanning clock WCLK8. When there is count over for the down counter, the down counter generates a clock pulse CLK1 and the address counter is counted up by 1 and count data ASO of the address counter is renewed and output to the address line of the RAM 35. That is, the DSO data address of the RAM 35 is incremented by 1. Then, in synchronization with the timing signal $T_0$, the next DSO (DS1) read from the RAM 35, is loaded to the down counter via the data register, and the down counter then down counts in synchronization with the main scanning clock WCLK8. When there is count over for the down counter, the down counter generates the clock pulse CLK1 and the address counter is counted up by 1 and the count data ASO of the address counter is renewed and output to the address line of the RAM 35. This is to say that the DSO data address of the RAM 35 is incremented by 1. Then, in synchronization with the timing signal $T_0$, the next DSO ($DS_2$) read from the RAM 35, is loaded to the down counter via the data register and the down counter then down counts in synchronization with the main scanning clock WCLK8 (frequency divided pulse of WCLK). The main scanning controller 51 then repeatedly performs similar processing and successively generates clock pulses CLK1, while at the same time counting clock pulses CLK1, and generating each of the various types of signals following a main scanning write processing timing signal PCDAB indicated in FIG. 6B. One part of these timing signals are applied by the frequency modulator 53 and the power modulator 52, and another part applied by the CPU 33, and are used as timing signals for sequence control of the electrical device elements related to print processing.

A description is given of the power modulation data DAD and the power modulator 52, with reference to FIG. 6C. The power modulation data DAD is the basic data for specifying the light emission power of the laser diode LD for each dot position in the main scanning direction B. The contents of this power modulation data include the amount of variation of the light emission power and the switching interval for adjacent dot blocks (virtual dot blocks with multiple dots in one block) in the main scanning direction B.

The power modulator 52 includes an address counter, a down counter and a data register (not indicated in the diagrams). Upon the fall of the laser main scanning synchronization signal DETP, the power modulator 52 sets an initial value AP in the address counter, and writes the power modulation data DAD ($DP_0$ is interval $DP_0'$ plus the increment/decrement amount $\pm S_0$ to change the light emission power) from the RAM 35 to the data register, in synchronization with the timing signal $T_1$. In addition, the initial light emission power data PINT held in the internal register 50 is loaded to an up-down counter in the power modulator 52 and this data is applied to the voltage/current converter circuit 28 (FIG. 3B).

When a modulation area signal CURV is at the "HIGH" level, the power modulator 52 continuously outputs the initial light emission power data PINT to the voltage/current converter circuit 28. When the modulation area signal CURV is at the "LOW" level, the power modulator 52 outputs the clock pulse CLK2. The address counter is incremented by 1 with the clock pulse signal CLK2 and the access address AP1 of the power modulation data DAD data in the RAM 35 is incremented by 1 to become AP+1. After this, the power modulation data DAD (DP1) read from RAM 35 in synchronization with the timing signal $T_1$, is written to the data register.

The data ($DP_0'$) amongst the power modulation data DAD which represents the light emission power switching interval is decremented by the down counter for every clock WCLK8. Clock pulse CLK2 is output when the down counter outputs a borrow. According to these two clock pulses, the up-down counter performs either increment or decrement by the amount $S_0$ in accordance with the data ($\pm S_0$) in the power modulation data DAD which represents the increment/decrement amount for the light emission power. This data is applied to the voltage/current converter circuit 28. This is to say that after the time interval corresponding to $DP_0'$ has elapsed from the output timing of the previous clock pulse CLK2, the light emission power is changed from the initial light emission power data PINT by an amount corresponding only to $\pm S_0$.

In addition, the address counter is again incremented by 1 with the clock pulse CLK2 and the access address AP1 of the power modulation data DAD in the RAM 35 is incremented by 1 to become AP+2. After this, the power modulation data DAD ($DP_2$) read from RAM 35 in synchronization with the timing signal $T_1$, is written to the data register. These operations are then repeated.

Figure 3E:
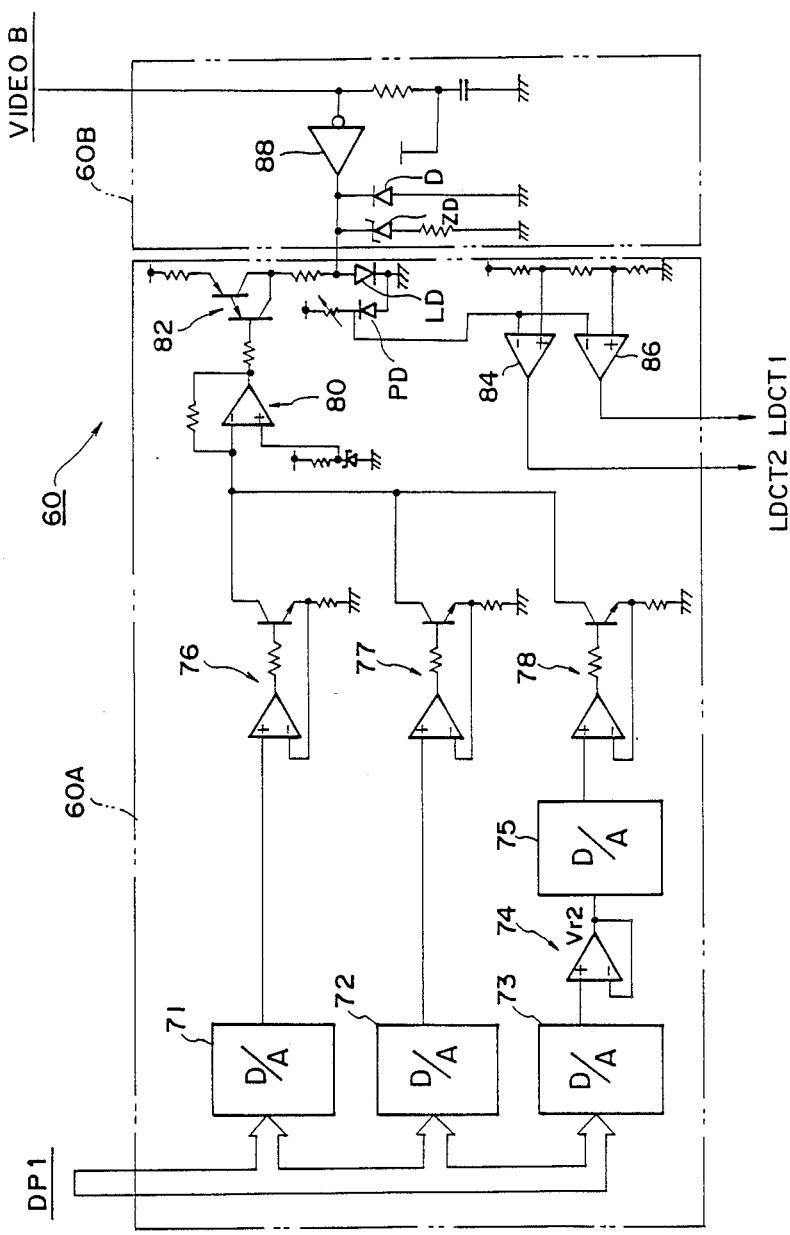
FIG. 3E is an electrical circuit diagram indicating the configuration of the LD driver 60 indicated in FIG. 3A.
Figure 4:
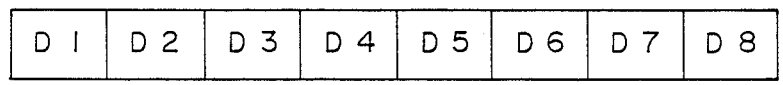
FIG. 4 is a plan view indicating the configuration of the data DD represented by the opening and closing of the eight switches of the dipswitches 31 indicated in FIG. 3B.
Figure 5A:
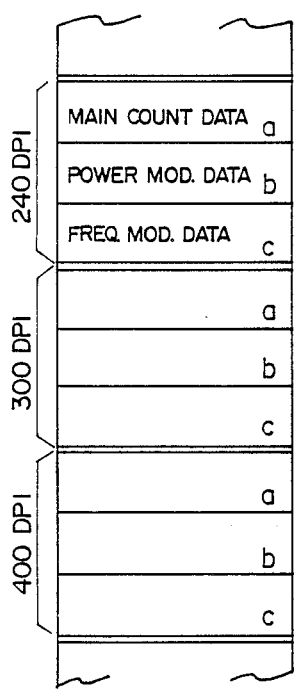
FIG. 5A, FIG. 5B, FIG. 5C and FIG. 5D are plan views indicating one part of data groups stored in the ROM 30 indicated in FIG. 3B.
Figure 5B:
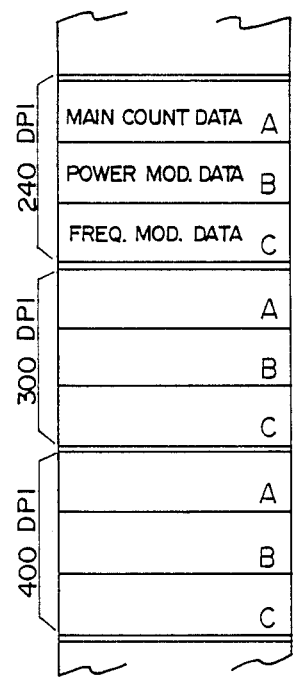
Figure 5C:
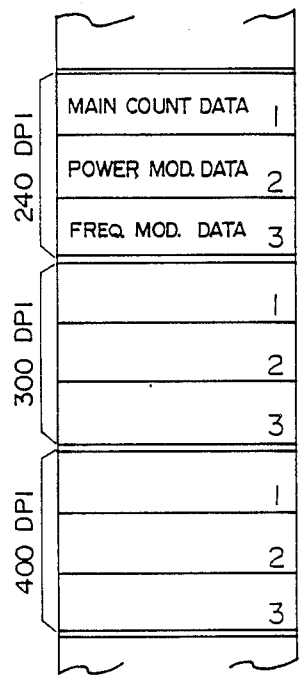
Figure 5D:
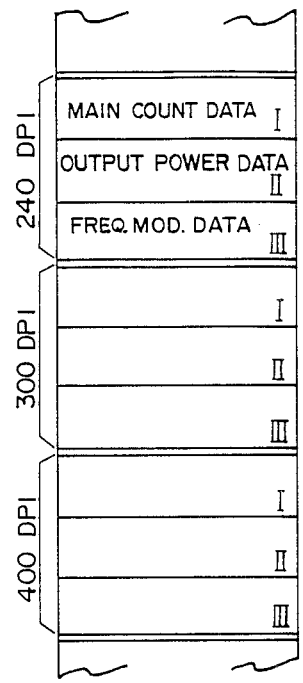

FIG. 3E indicates the configuration of the LD driver 60. The power specification data DP1 is applied to the current control circuit 60A of the LD driver 60 and determines the value of the current in the laser diode LD of the light source 11 (FIG. 2A, FIG. 2B). The laser diode LD is connected to a current ON/OFF control circuit 60B and when the image signals VIDEO B applied to the current ON/OFF control circuit 60B from the exposure controller 34 are "LOW" (0) to indicate "record", the output of the current ON/OFF control circuit 60B to the laser diode LD becomes "HIGH" interrupted from device ground, and current at the level specified by DP1 flows in the laser diode LD so that the laser diode LD emits a laser light beam with a level corresponding to DP1 When the image signal VIDEO B is "HIGH" (1) to indicate "no record," the output of the current ON/OFF control circuit 60B to the laser diode LD becomes "LOW" (connected to device earth), and current at a practical level does not flow in the laser diode LD and there is no light beam is emitted from the laser diode LD.

A further description is given of the configuration shown in FIG. 3E. The power designation data DP1 supplied from the aforementioned controller 34 is converted to three analog voltages of three systems through D/A converters 71–73, an operational amplifier 74 and a D/A converter 75. The analog voltages derived from the D/A converters 71, 72 and 73 are further converted into currents through voltage-current conversion circuits 76, 77 and 78, respectively. A wired-OR operation is made on the currents derived from the conversion circuits 76, 77 and 78. The wired-OR output current passes through LD current control circuits 80 and 82 and is supplied to the laser diode LD. Thereby, the output power control for the laser diode LD is carried out on the basis of the power designation data DP1. The video signal VIDEO B supplied from the developer controller 34 is supplied to a driver 88, which executes ON/OFF control of the laser diode LD on the basis of the supplied video signal VIDEO B.

As described previously, the LD driver 60 consists of the current control circuit 60A and the current ON/OFF control circuit 60B. The current control circuit 60A controls the output power control of the laser diode LD and is made up of the D/A converters 71–73 and 75, the operational amplifier 74, the voltage-current conversion circuits 76–78, and the LD current control circuits 80 and 82. The current ON/OFF control circuit 60B includes the driver 88 and executes ON/OFF control of the laser diode LD. The current control circuit 60A further includes comparators 84 and 86 and a pin photo diode PD for monitoring the amount of light which is backward emitted from the laser diode LD. The comparators 84 and 86 compare the output voltage of the pin photo diode PD corresponding to the amount of light with predetermined reference voltages and generate output signals LDCT2 and LDCT1, respectively. The output signals LDCT2 and LDCT1 are supplied to the developer controller 34 shown in FIG. 3D. The output signals LDCT2 and LDCT1 are stored in the latch circuit 151 with a predetermined timing designated by the power controller 152. At this time, the power controller 152 outputs the interrupt signal INT to the CPU 33 (FIG. 3C) In response to the interrupt signal, the CPU 33 correct the power designation data DP on the basis of the signals LDCT1 and LDCT2 stored in the latch circuit 151. A Zener diode ZD and a diode D are provided to stabilize the output signal of the driver 88.

Figure 8:
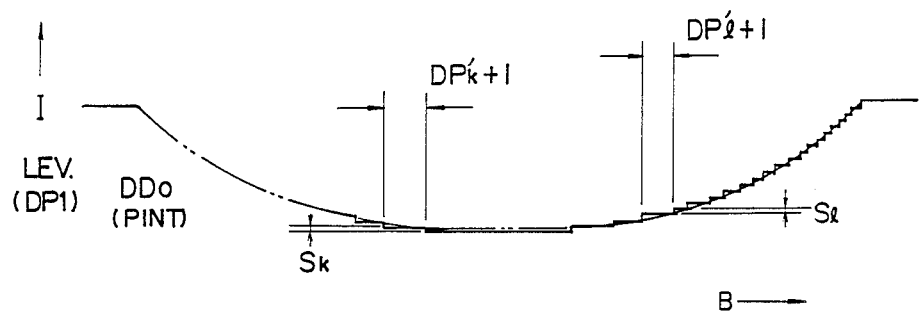
FIG. 8 is a graph of indicating an outline of the level distribution of the current made to flow in the laser diode LD by the current control circuit 60A indicated in FIG. 3E.

In a case where for example, the image signal VIDEO B records all dots for one line, then the DP1 output operation of the power modulator 52 as described above will cause current to flow in the laser diode LD in the manner approximately indicated by the current level distribution (for the main scanning direction B) in FIG. 8. This current level distribution is determined by the power modulation data DAD that was stored beforehand in the ROM 30 and that has been written to the RAM 35 by the CPU 33.

In FIG. 8, DP1' and $-S_k$ are the contents of the power modulation data DAD $DP_k'$ specifies the amount of progress (in WCLK8 units) of the main scanning, and $-S_k$ specifies the $S_k$ step-down for the current level. As an example, DP1' and $-S_k$ mean that the current level is stepped down by $S_k$ when the main scan has proceeded by $DP_k'+1$ pulse for WCLK8 pulses. DP1' and $S_1$ mean that the current level is stepped up by $S_1$ when the main scan has proceeded by $DP_1'+1$ pulse for WCLK8 pulses.

A description is given of the output frequency modulation data DF2, the frequency modulator 53 and the frequency divider 58, with reference to FIG. 6D. The output frequency modulation data DF2 is the basic data for the generation of the main scanning synchronization signal WCLK. This output frequency modulation data DF2 includes the switching interval for adjacent dot blocks in the main scanning direction B, and the frequency increment/decrement amount. Moreover, the frequency modulator 53 applies data specifying the frequency of a synchronization signal RCLK to the frequency divider 58, and the synchronization signal RCLK specified by the frequency modulator 53 are generated by the frequency divider 58 (FIG. 3D).

The frequency divider 58 comprises a down counter, and a mono-multivibrator that generates a high level pulse with a width of approximately 10 clocks of the clock $\phi$ and which is triggered by count over of the down counter. The down counter triggers the mono-multivibrator when it counts the number of clock $\phi$ indicated by the frequency data (FINT±t: reciprocal of the count number $\phi$) given by the frequency modulator 53, and then the down counter again starts counting the reciprocal of the count number $\phi$, and repeats this operation. Then, the frequency divider 58 outputs the output of the mono-multivibrator as the synchronization signal RCLK. If the frequency data applied by the frequency modulator 53 does not change, then the frequency divider 58 outputs a constant pulse width (H) and the synchronization signal RCLK with a constant cycle but if the cycle data of the frequency modulator 53 changes, the frequency divider 58 outputs the synchronization signal RCLK with the same pulse width but a different cycle.

The frequency modulator 53 comprises an address counter, a down counter, and up-down counter and a data register (all not indicated in the diagrams) and sets the address counter to an initial value Af with the fall of the laser line scanning synchronization signal DETP, and upon the timing signal $T_2$, writes the output frequency modulation data DF2 ($DF_0$ is the interval and the increment/decrement amount to change the frequency) read from the RAM 35, to the data register. In addition, the initial frequency data FINT held in the internal register 50 is loaded to the up-down counter of the frequency modulator 53 and the output of the frequency modulator 53 is output to the frequency divider 58. With this, the frequency divider 58 outputs a frequency modulation reference signal RCLK of a frequency FINT. When the modulation area signal CURV is "HIGH", the frequency modulator 53 outputs 1/FINT to the frequency divider 58, and outputs the clock pulse CLK3 when the signal CURV is "LOW". The address counter is counted up by 1 with the clock pulse CLK3, and the count data AF2 of the address counter is renewed and output to the address line of RAM 35. This is to say that the DF2 data access address of RAM 35 is incremented by 1. Then the next DF2 (DF1) read from the RAM 35 in synchronization with $T_2$, is held in the data register and 1/(FINT+$t_0$) that has changed from 1/FINT' is applied to the frequency divider 58. Then, the frequency divider 58 outputs the frequency modulation reference signal RCLK for which the frequency is FINT+$t_0$. After the data DF2 has been renewed, the frequency modulator 53 down counts the frequency modulation reference signal RCLK generated by the frequency divider 58, by the amount of interval data $DF_0'$ which is one of the contents of the output frequency modulation data DF2 data.

When there is count over for the down counter, the down counter generates the clock pulse CLK3, the address counter is counted up by 1, and the count data AF2 of the address counter is renewed and output to the address line of the RAM 35. This is to say that the DF2 access address of the RAM 35 is incremented by 1. Then, the next data DF2 ($DF_2$) is read from the RAM 35 in synchronization with the timing signal T and held in the data register. The following operation is executed in the same manner and the output to the frequency divider 58 is renewed with each generation of the clock pulse CLK3.

In this manner, the frequency modulator 53 renews the count value applied to the frequency divider 58 so that the frequency modulation reference signal RCLK output from the frequency divider 58 changes in accordance with the count value.

Figure 9:
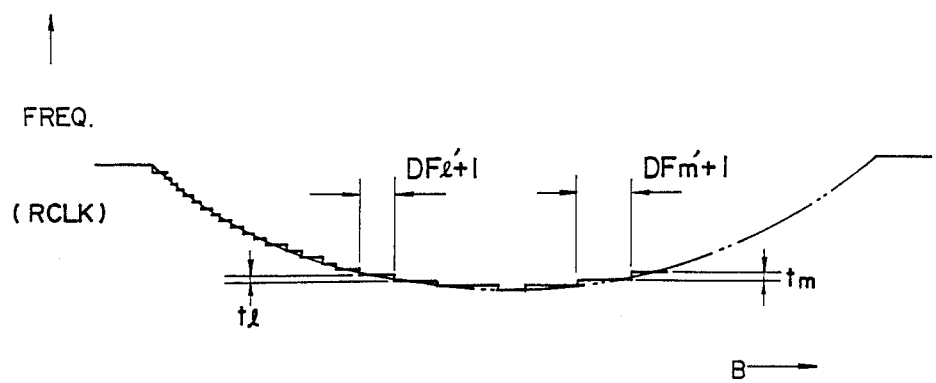
FIG. 9 is a graph indicating an outline of the frequency distribution of the frequency modulation reference signal RCLK generated by the frequency divider 58 indicated in FIG. 3D.

FIG. 9 shows an approximation of the frequency distribution (for the main scanning direction B) of the frequency modulation reference signal RCLK due to the operation of the frequency divider 58 and the operation of the frequency modulator 53 as described above. This is determined by the output frequency modulation data DF2 that is stored beforehand in the ROM 30 and is written to the RAM 35. In FIG. 9, $-t_1$, $DF_1'$, $+t_m$, and $DF_m'$ are the contents of the output frequency modulation data DF2. In this, $+t_m$ specifies the step up of the $t_m$ of the frequency, $-t_1$ specifies the step down of $t_1$, and $t_1$ and $t_m$ specify the amount of change of the frequencies, and $DF_1'$ and $DF_m'$ specify the amount of progress (in RCLK units) of the main scanning. For example, $+t_m$ and $DF_m'$ mean that the frequency is stepped up by $t_m$ when the main scanning has proceeded by $DF_m'+1$ RCLK clock pulses, and that $-t_m$ and $DF_1'$ mean that the frequency is stepped down by $t_m$ when the main scanning has proceeded by $DF_1'+1$ RCLK clock pulses. It also means that the FINT data held in the internal register 50 has the initial frequency.

The frequency modulation reference signal RCLK generated by the frequency divider 58 is applied to a phase comparator 160 (FIG. 30), which forms the aforementioned PLL circuit together with a frequency divider 59, an externally mounted low-pass filter, a voltage controlled oscillator 61 and a tap selector 62. The phase comparator 160 applies a pulse (main scanning synchronization signal WCLK) in synchronization with the frequency modulation reference signal RCLK, to the video interface 57 and the frequency divider 63 through the voltage controlled oscillator 61 and the tap selector 62. The frequency divider 63 generates the aforementioned main scanning clock WCLK8 on the basis of the pulse WCLK. The video interface 57 serially reads the image signal VIDEO B in synchronization with the pulse WCLK8 and applies it to the current ON/OFF control circuit 60B of the LD driver 60 (FIG. 3E).

The operation of the power modulator 52 as described above, and the power modulation data DAD that are stored beforehand in the ROM 30 and written to the RAM 35 by the CPU 33 are used as the basis for passing current at the current level distribution indicated in FIG. 8, to the laser diode LD of the light source 11 (FIG. 2A, FIG. 2B). In addition, the operation of the frequency modulator 53 and the output frequency modulation data DF2 written to the RAM 35 in the same way are used as the basis for the frequency of the main scanning synchronization signal WCLK becoming the frequency distribution that multiplies the frequency modulation reference signal RCLK as shown in FIG. 9, and for performing dot recording for one line in the main scanning in synchronization with WCLK. The current level distribution as shown in FIG. 8, and the frequency distribution as shown in FIG. 9, can have any desired distribution characteristics through the settings for (modification of) the power modulation data DAD and the output frequency modulation data DF2. Accordingly, this embodiment has four groups of data (FIGS. 5A through 5D) applicable to each of the respective four types of laser scanning units, stored in the ROM 30. Each group has four pairs of data corresponding to the fours pairs of recording dot densities. It is likely that laser scanning units of different types will have discrepancies in the scanning regions and so the timing signals that determine the main scanning region are also determined for each type of laser scanning unit. That is to say, four groups of main scanning counter data DSO (FIGS. 5A through 5D) applicable to each of the respective four types of laser scanning units, are also stored in the ROM 30. Each group has four pairs of data corresponding to the four pairs of recording dot densities.

Figure 7A:
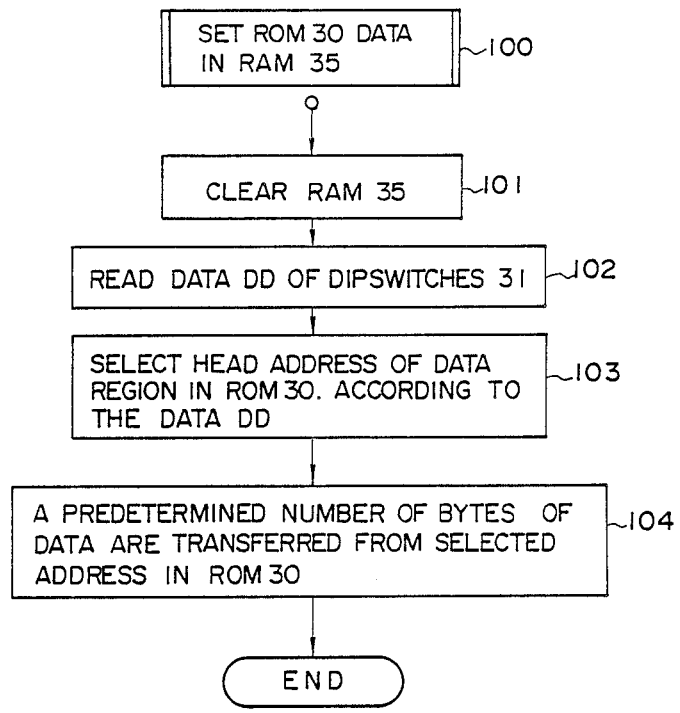
FIG. 7A, FIG. 7B and FIG. 7C are flow charts indicating the control operation of the CPU 33 indicated in FIG. 3C.

The ROM 30 stores the operation program for the CPU 33 of LSI 21. Immediately after initialization after the power has been applied, the CPU 33 executes the data settings shown in FIG. 7A, on the basis of this operation program (subroutine 100). The CPU 33 first clears the RAM 35 (step 101) and reads the data DD of the dipswitches 31 (step 102). Then, in accordance with the data DD that has been read, the CPU 33 then selects the head address of the data region in the ROM 30 (step 103). Then a predetermined number of bytes of data are transferred from the selected address in the ROM 30, the predetermined addresses in the RAM 35 under the control of the CPU 33 (step 104). Specifically, the CPU 33 reads the DSO, DAD and DF2 data (corresponding to the mounted laser scanning unit and the set recording dot density) specified by D1 through D4 of the DD data, and writes them in the RAM 35.

After this, the CPU 33 reads the data DD of the dipswitches 31 if there is a paper feed specification from the optional large-capacity paper supply cassette 10 or if there is a new specification, and then reads the dipswitches 31 and the first data $DS_0$ of the main scanning counter data DSO specified by D1 through D4 of the data DD. Then, the CPU 33 adds the adjustment amounts (in the horizontal adjustment switch column of FIG. 4) allocated to the codes formed by D5 through D8 of the data DD, to the read data $DS_0$ and the sum obtained is overwritten to the first data write region for the DSO data in RAM 35. Thereby write position adjustment for the main scanning direction B is done when there is paper feed from the large-capacity paper supply cassette 10. This position adjustment is by the amount specified by the dipswitches 31.

Figure 7B:
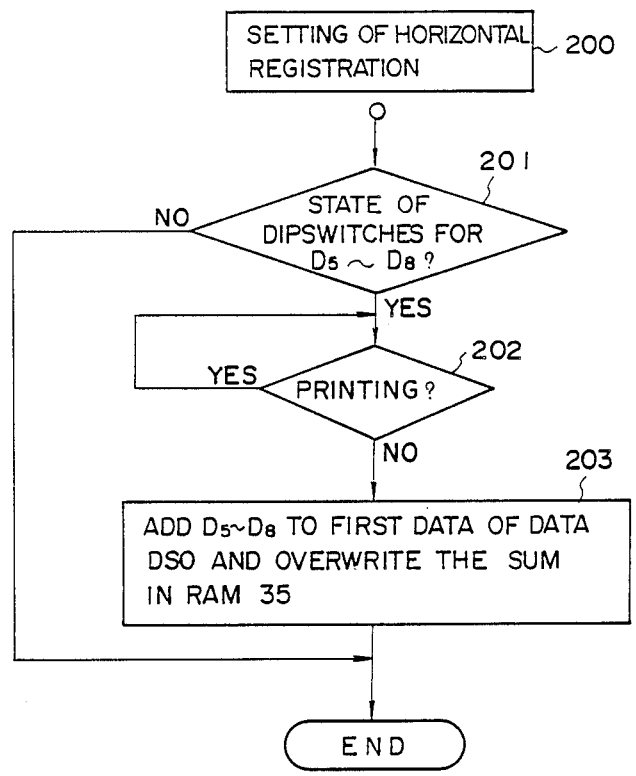

After this, while the paper feed setting from the large-capacity paper supply cassette 10 continues, the CPU 33 executes the horizontal registration settings indicated in FIG. 7B, at predetermined timing (step 200). That is, the CPU 33 reads the data DD of the dipswitches 31 and checks whether or not there has been any change in D5 through D8 of the data DD previously held in the register (step 201). If there has been a change, the CPU 33 overwrites the data that has just been read and checks whether or not a print cycle is being executed (step 202). If a print cycle is not being executed, then in the same manner as was performed for the previously described adjustment, the CPU 33 reads from the ROM 30 the first data $DS_0$ of the main scanning counter data DSO specified by D1 through D4 of the data DD. Then, the CPU 33 adds the adjustment amounts allocated to the codes formed by D5 through D8 of the data DD, to the read data $DS_0$ and the sum obtained is overwritten to the first data write region for the DSO data in RAM 35 (step 203). When this is performed, there is write position adjustment for the main scanning direction B and corresponding to the set amount of adjustment. Moreover, if the CPU 33 judges in step 202 that a print cycle is being executed, the CPU 33 will enter the standby status for the appropriate processing.

Figure 7C:
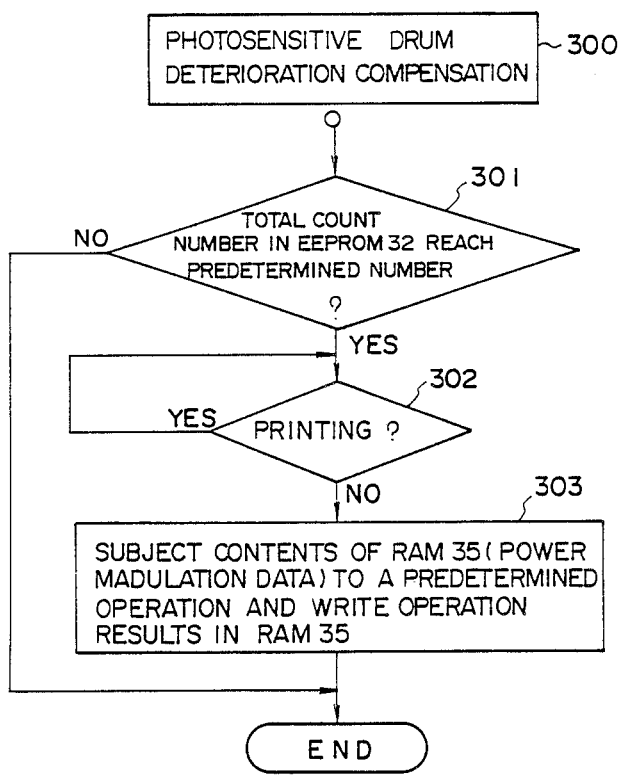

The photosensitive drum 1 will gradually deteriorate as the cumulative number of sheets of paper printed increases and this deterioration will lower the density of the prints. In order to compensate for this, the CPU 33 executes a photosensitive drum deterioration compensation (subroutine 300) as shown in FIG. 7C. That is, the CPU 33 writes a number to the EEPROM 32 for the number of times that the print cycle has been executed. The CPU 33 checks this cumulative number of executions at a predetermined timing and if this cumulative number of executions exceeds a set value (step 301), a check is performed as to whether a print cycle is being executed (step 302). If a print cycle is not being executed, the CPU 33 successively reads the power modulation data DAD from the first data, corrects the read data for the amount of photosensitive drum deterioration compensation and overwrites to RAM 35 (subroutine 303). This correction makes the power modulation data DAD respectively smaller by a predetermined ratio. Moreover, if the CPU 33 judges in step 302 that a print cycle is being executed, the CPU 33 will enter the standby status for the appropriate processing.

In the embodiment for which a description has been given above, a single RAM 35 is used by the CPU 33 and the exposure controller 34. That is, the CPU 33 and the exposure controller 34 share the RAM 35 memory for the storage of the data for main scanning characteristics compensation with respect to the type of laser scanning unit and the recording dot density (but although the storage areas are separately allocated, access is by time allocation). As shown more specifically in FIG. 6A, the exposure controller 34 reads the DSO, DAD and DF2 data from the RAM 35 at the timing when the clocks $T_0$, $T_1$ and $T_2$ fall, and the CPU 33 either writes or reads the data to or from the RAM 35 when the clock $\phi$ falls. With a configuration such as this, the exposure controller 34, CPU 33 and other elements 35 through 44 relating to their operation can be integrated onto the single LSI 21 to have the effect of reducing the number of elements.

As has been described above, this embodiment provides a laser beam printer in which the CPU 33 for print process control, the exposure controller 34 and the RAM 35 and the input/output elements 36 through 44 for the signals relating to the print process are all integrated onto LSI 21. Moreover, this embodiment provides a laser beam printer in which LSI 21 is connected to a ROM 30 that stores the process control program and the laser scanning characteristics compensation data, and which can execute print processes having characteristics in accordance with the data in the ROM 30. Accordingly, this printer can maintain normal print performance even when there is modification or correction of the data in the ROM 30 when the laser scanning unit is exchanged. Because the RAM 35 is shared between the CPU 33 and the exposure controller 34, it is possible for this laser beam printer to perform dynamic and precise control of the laser scanning unit.

In the embodiment described above, the dipswitches 31 are designed and the scanning characteristics compensation data is set in the ROM 30 to correspond to four types of recording dot densities and four types of laser scanning units. However, the data in the ROM 30 can be extended in order to further increase the range of application.

In this manner, it is possible to change the exposure scanning characteristics without exchanging the LSI 21, thereby raising the range of applicability of the LSI 21.

This is to say that there is an extremely large range of applicability for the combination of the exposure controller 34 and the CPU 33 which are the print process controllers. Accordingly, it is possible to unify the main controlled (LSI 21) of laser beam printers using laser scanning unit having different types of scanning methods.

The present invention is not limited to the aforementioned embodiments, and variations and modifications may be made without departing from the scope of the invention.

What is claimed is:

1. An image forming apparatus comprising:
   a recording medium;
   light source means for emitting a light beam;
   optical scanning means, provided between said light source means and said recording means, for scanning said recording medium by deflecting said light beam emitted from said light source means to thereby form an image on said recording medium, said optical scanning means having one of predetermined optical characteristics different from each other;
   memory means for storing a plurality of sets of control data provided for said predetermined optical characteristics of said optical scanning means, said control data being used for controlling said light source means;
   control data selecting means for selecting one of the sets of control data which relates to said one of the predetermined optical characteristics of said optical scanning means; and
   control means for controlling said light source means on the basis of image data and said selected one of sets of control data.

2. An image forming apparatus as claimed in claim 1, wherein each of the sets of said control data includes characteristic data relating to a corresponding dot area scanning time during which said light source means continuously emits said light beam to form one dot area, and wherein said control means includes driving means for turning ON/OFF said light source means for every dot in accordance with said image data, and setting means for setting a real scanning time during which said light source means continuously emits said light beam to form one dot area on the basis of said characteristic data relating to the corresponding dot area scanning time included in said selected one of the sets of control data, so that said recording medium can be scanned by said light beam adjusted so as to conform to the optical characteristic of said optical scanning means actually mounted between said light source means and said recording medium.

3. An image forming apparatus as claimed in claim 1, wherein each of the sets of said control data includes characteristic data relating to a corresponding strength of said light beam emitted from said light source means, and wherein said control means includes driving means for turning ON/OFF said light source means for every dot in accordance with said image data, and strength adjusting means for adjusting the strength of said light beam to be emitted from said light source means on the basis of said characteristic data relating to the corresponding strength of said light beam included in said selected one of the sets of control data, so that said recording medium can be scanned by said light beam adjusted so as to conform to the optical characteristic of said optical scanning means actually mounted between said light source means and said recording medium.

4. An image forming apparatus as claimed in claim 1, wherein each of the sets of said control data includes characteristic data relating to a corresponding scan starting position of said deflected light beam on said recording medium, and wherein said control means includes driving means for turning ON/OFF said light source means for every dot in accordance with said image data, and means for adjusting the scan starting position on the basis of said characteristic data relating to the corresponding scan starting position included in said selected one of the sets of control data, so that said recording medium can be scanned by said light beam from the scan starting point adjusted so as to conform to the optical characteristic of said optical scanning means actually mounted between said light source means and said recording medium.

5. An image forming apparatus as claimed in claim 1, wherein said optical scanning means includes a rotating deflector and an $f\theta$ lens, and said memory means stores control data relating to said optical scanning means including said rotating deflector and said $f\theta$ lens.

6. An image forming apparatus as claimed in claim 1, wherein said optical scanning means includes a rotating polygonal mirror and a flat lens, and said memory means stores control data relating to said optical scanning means including said rotating polygonal mirror and said flat lens.

7. An image forming apparatus as claimed in claim 1, wherein said optical scanning means includes a Galvano mirror, and said memory means stores control data relating to said optical scanning means including said Galvano mirror.

8. An image forming apparatus as claimed in claim 1, wherein said optical scanning means includes a curved polygonal mirror, and said memory means stores control data relating to said optical scanning means including said curved polygonal mirror.

9. An image forming apparatus comprising:
a recording medium;
light source means for emitting a light beam;
optical scanning means, provided between said light source means and said recording means, for scanning said recording medium by deflecting said light beam emitted from said light source means to thereby form an image on said recording medium, said optical scanning means having one of predetermined optical characteristics different from each other;
memory means for storing a plurality of sets of control data provided for said predetermined optical characteristics of said optical scanning means, said control data being used for controlling said light source means;
control data selecting means for selecting one of the sets of control data which relates to said one of the predetermined optical characteristics of said optical scanning means; and
control means for controlling said light source means on the basis of image data and said selected one of sets of control data;
wherein each of the sets of said control data includes characteristic data relating to a corresponding dot area scanning time during which said light source means continuously emits said light beam to form one dot area, and wherein said control means includes driving means for turning ON/OFF said light source means for every dot in accordance with said image data, and setting means for setting a real scanning time during which said light source means continuously emits said light beam to form one dot area on the basis of said characteristic data relating to the corresponding dot area scanning time included in said selected one of the sets of control data, so that said recording medium can be scanned by said light beam adjusted so as to conform to the optical characteristic of said optical scanning means actually mounted between said light source means and said recording medium; and
wherein said setting means includes generating means for generating a synchronizing signal having a frequency to be adjusted on the basis of said characteristic data relating to the corresponding dot area scanning time, and wherein said driving means controls said light source means in synchronism with said frequency-adjusted synchronizing signal derived from said generating means.

10. An image forming apparatus comprising:
a recording medium;
light source means for emitting a light beam;
optical scanning means, provided between said light source means and said recording means, for scanning said recording medium by deflecting said light beam emitted from said light source means to thereby form an image on said recording medium, said optical scanning means having one of predetermined optical characteristics different from each other;
memory means for storing a plurality of sets of control data provided for said predetermined optical characteristics of said optical scanning means, said control data being used for controlling said light source means;
control data selecting means for selecting one of the sets of control data which relates to said one of the predetermined optical characteristics of said optical scanning means; and
control means for controlling said light source means on the basis of image data and said selected one of sets of control data;
wherein each of the sets of said control data includes characteristic data relating to a corresponding strength of said light beam emitted from said light source means, and wherein said control means includes driving means for turning ON/OFF said light source means for every dot in accordance with said image data, and strength adjusting means for adjusting the strength of said light beam to be emitted from said light source means on the basis of said characteristic data relating to the corresponding strength of said light beam included in said selected one of the sets of control data, so that said recording medium can be scanned by said light beam adjusted so as to conform to the optical characteristic of said optical scanning means actually mounted between said light source means and said recording medium;
wherein said strength adjusting means includes current supplying means for supplying said light source means with a driving current, the value of which is adjusted on the basis of said correction data relating to the corresponding strength of said light beam.

11. An image forming apparatus comprising:
a recording medium;
light source means for emitting a light beam;
optical scanning means, provided between said light source means and said recording means, for scanning said recording medium by deflecting said light beam emitted from said light source means to thereby form an image on said recording medium, said optical scanning means having one of predetermined optical characteristics different from each other;

memory means for storing a plurality of sets of control data provided for said predetermined optical characteristics of said optical scanning means, said control data being used for controlling said light source means;

control data selecting means for selecting one of the sets of control data which relates to said one of the predetermined optical characteristics of said optical scanning means; and control means for controlling said light source means on the basis of image data and said selected one of sets of control data, each of the sets of said control data including first characteristic data relating to a corresponding dot area scanning time during which said light source means continuously emits said light beam to form one dot area, and second characteristic data relating to a corresponding strength of said light beam emitted from said light source means, said control means including first means for turning ON/OFF said light source means for every dot in accordance with said image data, second means for setting a real scanning time during which said light source means continuously emits said light beam to form one dot area on the basis of said first characteristic data relating to the corresponding dot area scanning time included in said selected one of the sets of control data, and third means for adjusting the strength of said light beam to be emitted from said light source means on the basis of said second characteristic data relating to the corresponding strength of said light beam included in said selected one of the sets of control data, so that said recording medium can be scanned by said light beam adjusted so as to conform to the optical characteristic of said optical scanning means.

12. An image forming apparatus comprising:

a recording medium;

light source means for emitting a light beam;

optical scanning means, provided between said light source means and said recording means, for scanning said recording medium by deflecting said light beam emitted from said light source means to thereby form an image on said recording medium, said optical scanning means having one of predetermined optical characteristics different from each other;

memory means for storing a plurality of sets of control data provided for said predetermined optical characteristics of said optical scanning means, said control data being used for controlling said light source means;

control data selecting means for selecting one of the sets of control data which relates to said one of the predetermined optical characteristics of said optical scanning means; and control means for controlling said light sources means on the basis of image data and said selected one of sets of control data, each of the sets of said control data including first characteristic data relating to a corresponding dot area scanning time during which said light source means continuously emits said light beam to form one dot area, and second characteristic data relating to a corresponding strength of said light beam emitted from said light source means, said control means including first means for turning ON/OFF said light source means for every dot in accordance with said image data, second means for setting a real scanning time during which said light source means continuously emits said light beam to form one dot area on the basis of said first characteristic data relating to the corresponding dot area scanning time included in said selected one of the sets of control data, and third means for adjusting the strength of said light beam, to be emitted from said light source means on the basis of said second characteristic data relating to the corresponding strength of said light beam included in said selected one of the sets of control data, so that said recording medium can be scanned by said light beam adjusted so as to conform to the optical characteristic of said optical scanning means;

wherein said first and second characteristic data have a relationship such that when said second means sets the real scanning time so as to increase on the basis of said corresponding characteristic data, said third means adjusts the strength of said light beam so as to increase.

13. An image forming apparatus comprising:

a recording medium;

light source means for emitting a light beam;

optical scanning means, provided between said light source means and said recording means, for scanning said recording medium by deflecting said light beam emitted from said light source means to thereby form an image on said recording medium, said optical scanning means having one of predetermined optical characteristics different from each other;

memory means for storing a plurality of sets of control data provided for said predetermined optical characteristics of said optical scanning means, said control data being used for controlling said light source means;

control data selecting means for selecting one of the sets of control data which relates to said one of the predetermined optical characteristics of said optical scanning means; and control means for controlling said light sources means on the basis of image data and said selected one of sets of control data, each of the sets of said control data including first characteristic data relating to a corresponding dot area scanning time during which said light source means continuously emits said light beam to form one dot area, and second characteristic data relating to a corresponding strength of said light beam emitted from said light source means, said control means including first means for turning ON/OFF said light source means for every dot in accordance with said image data, second means for setting a real scanning time during which said light source means continuously emits said light beam to form one dot area on the basis of said first characteristic data relating to the corresponding dot area scanning time included in said selected one of the sets of control data, and third means for adjusting the strength of said light beam to be emitted from said light source means on the basis of said second characteristic data relating to the corresponding strength of said light beam included in said selected one of the sets of control data, so that said recording medium can be scanned by said light beam adjusted so as to conform to the optical characteristic of said optical scanning means;

wherein said second means includes generating means for generating a synchronizing signal having a frequency to be corrected on the basis of said first characteristic data relating to the corresponding dot area scanning time, and wherein said first means controls said light source means in synchronism with said frequency-adjusted synchronizing signal derived from said generating means.

14. An image forming apparatus comprising:

a recording medium;

light source means for emitting a light beam;

optical scanning means, provided between said light source means and said recording means, for scanning said recording medium by deflecting said light beam emitted from said light source means to thereby form an image on said recording medium, said optical scanning means having one of predetermined optical characteristics different from each other;

memory means for storing a plurality of sets of control data provided for said predetermined optical characteristics of said optical scanning means, said control data being used for controlling said light source means;

control data selecting means for selecting one of the sets of control data which relates to said one of the predetermined optical characteristics of said optical scanning means; and control means for controlling said light sources means on the basis of image data and said selected one of sets of control data, each of the sets of said control data including first characteristic data relating to a corresponding dot area scanning time during which said light source means continuously emits said light beam to form one dot area, and second characteristic data relating to a corresponding strength of said light beam emitted from said light source means, said control means including first means for turning ON/OFF said light source means for every dot in accordance with said image data, second means for setting a real scanning time during which said light source means continuously emits said light beam to form one dot area on the basis of said first characteristic data relating to the corresponding dot area scanning time included in said selected one of the sets of control data, and third means for adjusting the strength of said light beam to be emitted from said light source means on the basis of said second characteristic data relating to the corresponding strength of said light beam included in said selected one of the sets of control data, so that said recording medium can be scanned by said light beam adjusted so as to conform to the optical characteristic of said optical scanning means;

wherein said third means includes current supplying means for supplying said light source means with a driving current, the value of which is adjusted on the basis of said second characteristic data relating to the corresponding strength of said light beam.

15. An image forming apparatus comprising:

a recording medium;

light source means for emitting a light beam;

optical scanning means, provided between said light source means and said recording means, for scanning said recording medium by deflecting said light beam emitted from said light source means to thereby form an image on said recording medium, said optical scanning means having one of predetermined optical characteristics different from each other;

memory means for storing a plurality of sets of control data provided for said predetermined optical characteristics of said optical scanning means, said control data being used for controlling said light source means;

control data selecting means for selecting one of the sets of control data which relates to said one of the predetermined optical characteristics of said optical scanning means; and control means for controlling said light sources means on the basis of image data and said selected one of sets of control data, each of the sets of said control data including first characteristic data relating to a corresponding dot area scanning time during which said light source means continuously emits said light beam to form one dot area, and second characteristic data relating to a corresponding strength of said light beam emitted from said light source means, said control means including first means for turning ON/OFF said light source means for every dot in accordance with said image data, second means for setting a real scanning time during which said light source means continuously emits said light beam to form one dot area on the basis of said first characteristic data relating to the corresponding dot area scanning time included in said selected one of the sets of control data, and third means for adjusting the strength of said light beam to be emitted from said light source means on the basis of said second characteristic data relating to the corresponding strength of said light beam included in said selected one of the sets of control data, so that said recording medium can be scanned by said light beam adjusted so as to conform to the optical characteristic of said optical scanning means;

further comprising recording density setting means for setting one of predetermined recording densities, wherein said first and second characteristic data provided for each of the sets of said optical characteristics are provided for each of the predetermined recording pixel densities.

16. An image forming apparatus comprising:

a recording medium;

light source means for emitting a light beam;

optical scanning means, provided between said light source means and said recording means, for scanning said recording medium by deflecting said light beam emitted from said light source means to thereby form an image on said recording medium, said optical scanning means having one of predetermined optical characteristics different from each other;

memory means for storing a plurality of sets of control data provided for said predetermined optical characteristics of said optical scanning means, said control data being used for controlling said light source means;

control data selecting means for selecting one of the sets of control data which relates to said one of the predetermined optical characteristics of said optical scanning means; and control means for controlling said light sources means on the basis of image data and said selected one of sets of control data, each of the sets of said control data including first characteristic data relating to a corresponding dot area scanning time during which said light source means continuously emits said light beam to form one dot area, and second characteristic data relating to a corresponding strength of said light beam emitted from said light source means, said control means including first means for turning ON/OFF said light source means for every dot in accordance with said image data, second means for setting a real scanning time during which said light source means continuously emits said light beam to form one dot area on the basis of said first characteristic data relating to the corresponding dot area scanning time included in said selected one of the sets of control data, and third means for adjusting the strength of said light beam to be emitted from said light source means on the basis of said second characteristic data relating to the corresponding strength of said light beam included in said selected one of the sets of control data, so that said recording medium can be scanned by said light beam adjusted so as to conform to the optical characteristic of said optical scanning means;

wherein said control data selecting means includes first switching means for generating an instruction signal indicative of the optical characteristic of said optical scanning means actually provided between said recording medium and said light source means, and wherein said instruction signal is supplied, as an address signal, to said memory means.

17. An image forming apparatus comprising:

a recording medium;

light source means for emitting a light beam;

optical scanning means, provided between said light source means and said recording means, for scanning said recording medium by deflecting said light beam emitted from said light source means to thereby form an image on said recording medium, said optical scanning means having one of predetermined optical characteristics different from each other;

memory means for storing a plurality of sets of control data provided for said predetermined optical characteristics of said optical scanning means, said control data being used for controlling said light source means;

control data selecting means for selecting one of the sets of control data which relates to said one of the predetermined optical characteristics of said optical scanning means; and control means for controlling said light sources means on the basis of image data and said second one of sets of control data, each of the sets of said control data including first characteristic data relating to a corresponding dot area scanning time during which said light source means continuously emits said light beam to form one dot area, and second characteristic data relating to a corresponding strength of said light beam emitted from said light source means, said control means including first means for turning ON/OFF said light source means for every dot in accordance with said image data, second means for setting a real scanning time during which said light source means continuously emits said light beam to form one dot area on the basis of said first characteristic data relating to the corresponding dot area scanning time included in said selected one of the sets of control data, and third means for adjusting the strength of said light beam to be emitted from said light source means on the basis of said second characteristic data relating to the corresponding strength of said light beam included in said selected one of the sets of control data, so that said recording medium can be scanned by said light beam adjusted so as to conform to the optical characteristic of said optical scanning means;

wherein said memory means includes a read only memory.

18. An image forming apparatus comprising:

a recording medium;

light source means for emitting a light beam;

optical scanning means, provided between said light source means and said recording means, for scanning said recording medium by deflecting said light beam emitted from said light source means to thereby form an image on said recording medium, said optical scanning means having one of predetermined optical characteristics different from each other;

memory means for storing a plurality of sets of control data provided for said predetermined optical characteristics of said optical scanning means, said control data being used for controlling said light source means;

control data selecting means for selecting one of the sets of control data which relates to said one of the predetermined optical characteristics of said optical scanning means; and control means for controlling said light sources means on the basis of image data and said selected one of sets of control data, each of the sets of said control data including first characteristic data relating to a corresponding dot area scanning time during which said light source means continuously emits said light beam to form one dot area, and second characteristic data relating to a corresponding strength of said light beam emitted from said light source means, said control means including first means for turning ON/OFF said light source means for every dot in accordance with said image data, second means for setting a real scanning time during which said light source means continuously emits said light beam to form one dot area on the basis of said first characteristic data relating to the corresponding dot area scanning time included in said selected one of the sets of control data, and third means for adjusting the strength of said light beam to be emitted from said light source means on the basis of said second characteristic data relating to the corresponding strength of said light beam included in said selected one of the sets of control data, so that said recording medium can be scanned by said light beam adjusted so as to conform to the optical characteristic of said optical scanning means;

wherein said memory means has storage areas provided for said predetermined optical characteristics of said optical scanning means, and wherein said control data including said first and second characteristic data are stored in corresponding one of said storage areas.

19. An image forming apparatus comprising:
a recording medium;
light source means for emitting a light beam;
optical scanning means, provided between said light source means and said recording means, for scanning said recording medium by deflecting said light beam emitted from said light source means to thereby form an image on said recording medium, said optical scanning means having one of predetermined optical characteristics different from each other;
memory means for storing a plurality of sets of control data provided for said predetermined optical characteristics of said optical scanning means, said control data being used for controlling said light source means;
control data selecting means for selecting one of the sets of control data which relates to said one of the predetermined optical characteristics of said optical scanning means; and
control means for controlling said light source means on the basis of image data and said selected one of sets of control data,
each of the sets of said control data including first characteristic data relating to a corresponding dot area scanning time during which said light source means continuously emits said light beam to form one dot area, second characteristic data relating to a corresponding strength of said light beam emitted from said light source means, and third characteristic data relating to a corresponding scan starting position on said recording medium,
said control means including first means for turning ON/OFF said light source means for every dot in accordance with said image data, second means for setting a real scanning time during which said light source means continuously emits said light beam to form one dot area on the basis of said first characteristic data relating to the corresponding dot area scanning time included in said selected one of the sets of control data, third means for adjusting the strength of said light beam to be emitted from said light source means on the basis of said second characteristic data relating to the corresponding strength of said light beam included in said selected one of the sets of control data, and fourth means for adjusting the scan start position on the basis of said characteristic data relating to the corresponding scan starting position included in said selected one of the sets of control data,
so that said recording medium can be scanned by said light beam adjusted so as to conform to the optical characteristic of said optical scanning means.

20. An image forming apparatus comprising:
a recording medium;
light source means for emitting a light beam;
optical scanning means, provided between said light source means and said recording means, for scanning said recording medium by deflecting said light beam emitted from said light source means to thereby form an image on said recording medium, said optical scanning means having one of predetermined optical characteristics different from each other;
memory means for storing a plurality of sets of control data provided for said predetermined optical characteristics of said optical scanning means, said control data being used for controlling said light source means;
control data selecting means for selecting one of the sets of control data which relates to said one of the predetermined optical characteristics of said optical scanning means; and
a large scale integrated circuit having control means for controlling said light source means on the basis of image data and said one of the sets of control data,
said memory means being externally connected to said large scale integrated circuit.

21. An image forming apparatus as claimed in claim 20, wherein:
said memory means comprises a read only memory;
said control data selecting means comprises a dip switch; and
said control means of said large scale integrated circuit reads out said one of the sets of control data selected by said control data selecting means from said memory means of said read only memory.

22. An image forming apparatus as claimed in claim 21, wherein said control means of said large scale integrated circuit reads out said one of the sets of control data from said memory means after power supply to said image forming apparatus is started.

* * * * *